(12) United States Patent
Grossmann et al.

(10) Patent No.: US 10,565,802 B2
(45) Date of Patent: Feb. 18, 2020

(54) COLLABORATIVE MULTI-MODAL MIXED-REALITY SYSTEM AND METHODS LEVERAGING RECONFIGURABLE TANGIBLE USER INTERFACES FOR THE PRODUCTION OF IMMERSIVE, CINEMATIC, AND INTERACTIVE CONTENT

(71) Applicant: Disney Enterprises, Inc., Burbank, CA (US)

(72) Inventors: Benjamin Grossmann, Burbank, CA (US); Robert Legato, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 54 days.

(21) Appl. No.: 15/900,694

(22) Filed: Feb. 20, 2018

(65) Prior Publication Data
US 2019/0066387 A1 Feb. 28, 2019

Related U.S. Application Data

(60) Provisional application No. 62/553,127, filed on Aug. 31, 2017.

(51) Int. Cl.
*G06T 19/00* (2011.01)
*G06T 19/20* (2011.01)
*G06F 3/01* (2006.01)
*G02B 27/01* (2006.01)

(52) U.S. Cl.
CPC ............ *G06T 19/20* (2013.01); *G02B 27/017* (2013.01); *G06F 3/011* (2013.01); *G06F 3/017* (2013.01); *G06T 19/00* (2013.01); *G06T 19/003* (2013.01); *G06T 2200/24* (2013.01)

(58) Field of Classification Search
None
See application file for complete search history.

(56) References Cited

U.S. PATENT DOCUMENTS

| 6,160,907 A * | 12/2000 | Robotham | G06T 13/00 345/419 |
| 6,310,619 B1 * | 10/2001 | Rice | G06F 3/016 345/420 |
| 6,377,263 B1 * | 4/2002 | Falacara | G06N 3/006 345/473 |
| 6,476,802 B1 * | 11/2002 | Rose | G06T 13/00 345/419 |

(Continued)

*Primary Examiner* — Martin Mushambo
(74) *Attorney, Agent, or Firm* — Sheppard Mullin Richter & Hampton LLP

(57) ABSTRACT

The disclosure is directed to collaborative multi-modal mixed-reality systems and methods leveraging reconfigurable tangible user interfaces for the production of immersive, cinematic, and interactive content. As described herein, content may be created as either a mixture of live action media and computer generated media, combined together in context; or content made up entirely from computer-generated media alone. The technology described herein may leverage physical and software-based user interfaces that merge and unite the physical world and the virtual world, which allow users to produce new forms of content with a user experience and user interactions that emulate traditional processes.

23 Claims, 16 Drawing Sheets

(56) References Cited

U.S. PATENT DOCUMENTS

| Patent/Publication No. | Date | Inventor | Classification |
|---|---|---|---|
| 6,674,437 B1* | 1/2004 | Rose | G06T 13/20 345/473 |
| 6,714,201 B1* | 3/2004 | Grinstein | G06T 13/20 345/474 |
| 7,007,295 B1* | 2/2006 | Rose | H04N 7/165 345/419 |
| 7,050,955 B1* | 5/2006 | Carmel | G06T 19/00 345/418 |
| 7,113,183 B1* | 9/2006 | Collins | G06T 15/405 345/419 |
| 7,343,278 B2* | 3/2008 | Billinghurst | G06K 9/32 345/420 |
| 7,466,315 B2* | 12/2008 | Beda | G06F 8/38 345/419 |
| 7,834,890 B2* | 11/2010 | Fujiki | G06F 3/0481 345/419 |
| 8,228,366 B2* | 7/2012 | Benitez | G06T 1/0007 345/419 |
| 8,373,704 B1* | 2/2013 | Mueller | G06T 13/40 345/419 |
| 9,880,441 B1* | 1/2018 | Osterhout | G02F 1/153 |
| 9,888,105 B2* | 2/2018 | Rhoads | H04N 5/23229 |
| 9,888,179 B1* | 2/2018 | Liang | H04N 5/23258 |
| 2002/0042819 A1* | 4/2002 | Reichert | G06Q 30/06 709/217 |
| 2003/0172366 A1* | 9/2003 | Rhee | G06F 17/50 717/100 |
| 2004/0189645 A1* | 9/2004 | Beda | G06F 8/38 345/473 |
| 2004/0189669 A1* | 9/2004 | David | G06F 9/451 345/619 |
| 2004/0239679 A1* | 12/2004 | Ito | G06T 15/00 345/555 |
| 2005/0110790 A1* | 5/2005 | D'Amora | G06T 17/00 345/419 |
| 2005/0234946 A1* | 10/2005 | Woo | G06T 17/00 |
| 2005/0248563 A1* | 11/2005 | Grassia | G06T 15/00 345/419 |
| 2005/0248564 A1* | 11/2005 | Grassia | G06T 13/00 345/419 |
| 2005/0248573 A1* | 11/2005 | Grassia | G06T 17/005 345/473 |
| 2006/0139346 A1* | 6/2006 | Jang | G06T 9/001 345/418 |
| 2007/0109298 A1* | 5/2007 | Elmieh | G06T 15/005 345/419 |
| 2007/0146390 A1* | 6/2007 | Noro | G06F 3/014 345/633 |
| 2007/0204211 A1* | 8/2007 | Paxson | G06F 17/2229 715/205 |
| 2007/0257903 A1* | 11/2007 | Gutierrez | G06T 17/05 345/419 |
| 2007/0257906 A1* | 11/2007 | Shimura | A63F 13/10 345/419 |
| 2008/0049015 A1* | 2/2008 | Elmieh | G06T 13/20 345/420 |
| 2008/0307394 A1* | 12/2008 | Marchant | G06F 9/44521 717/120 |
| 2009/0033623 A1* | 2/2009 | Lin | G06F 3/014 345/158 |
| 2009/0128552 A1* | 5/2009 | Fujiki | G06T 19/006 345/419 |
| 2010/0066731 A1* | 3/2010 | Vecore | G06T 15/40 345/419 |
| 2010/0073363 A1* | 3/2010 | Densham | G05B 17/02 345/419 |
| 2010/0085351 A1* | 4/2010 | Deb | G06T 15/00 345/419 |
| 2010/0097372 A1* | 4/2010 | Gies | G06T 15/06 345/419 |
| 2010/0182400 A1* | 7/2010 | Nelson | G06T 19/006 348/42 |
| 2010/0194768 A1* | 8/2010 | Schrag | G06T 15/04 345/584 |
| 2010/0225644 A1* | 9/2010 | Swope, III | G06T 13/00 345/419 |
| 2011/0157155 A1* | 6/2011 | Turner | G06T 19/20 345/419 |
| 2011/0219339 A1* | 9/2011 | Densham | G06T 15/00 715/849 |
| 2011/0221656 A1* | 9/2011 | Haddick | G02B 27/017 345/8 |
| 2011/0234587 A1* | 9/2011 | Maigret | G06T 15/50 345/419 |
| 2012/0086720 A1* | 4/2012 | Burley | G06T 15/04 345/582 |
| 2012/0092342 A1* | 4/2012 | Suzuki | G06T 15/04 345/420 |
| 2012/0229449 A1* | 9/2012 | Psistakis | G11B 27/034 345/419 |
| 2012/0233555 A1* | 9/2012 | Psistakis | G06Q 10/101 715/751 |
| 2012/0280988 A1* | 11/2012 | Lampotang | G09B 23/285 345/419 |
| 2013/0120422 A1* | 5/2013 | Rao | G06T 13/00 345/581 |
| 2013/0191439 A1* | 7/2013 | Kern | G06F 16/986 709/203 |
| 2013/0235034 A1* | 9/2013 | Reitan | G06F 3/011 345/419 |
| 2013/0278607 A1* | 10/2013 | Twigg | G06T 13/80 345/473 |
| 2013/0286004 A1* | 10/2013 | McCulloch | G06T 19/006 345/419 |
| 2014/0015829 A1* | 1/2014 | Park | G09G 5/006 345/419 |
| 2014/0125649 A1* | 5/2014 | Carlin | G06T 19/00 345/419 |
| 2014/0168218 A1* | 6/2014 | Mitrea | H04N 21/23412 345/420 |
| 2014/0184606 A1* | 7/2014 | de Richebourg | G06T 1/60 345/440 |
| 2014/0204026 A1* | 7/2014 | Liu | G06F 3/1454 345/158 |
| 2014/0279581 A1* | 9/2014 | Devereaux | G06Q 50/184 705/310 |
| 2014/0368522 A1* | 12/2014 | Arbree | G06T 1/60 345/555 |
| 2015/0120883 A1* | 4/2015 | Gurtowski | H04L 65/60 709/219 |
| 2015/0140535 A1* | 5/2015 | Geri | G09B 23/28 434/262 |
| 2015/0234454 A1* | 8/2015 | Kurz | H04N 5/33 345/156 |
| 2015/0339275 A1* | 11/2015 | Schillings | G06F 17/2247 715/234 |
| 2015/0339842 A1* | 11/2015 | Gay | G11B 27/036 345/419 |
| 2016/0093108 A1* | 3/2016 | Mao | A63F 13/42 345/633 |
| 2016/0261841 A1* | 9/2016 | Mathew | A63F 13/00 |
| 2016/0299563 A1* | 10/2016 | Stafford | G02B 27/017 |
| 2016/0314613 A1* | 10/2016 | Nowozin | G06T 15/506 |
| 2017/0124762 A1* | 5/2017 | Privault | G06T 19/006 |
| 2017/0223097 A1* | 8/2017 | Zhang | H04L 67/1008 |
| 2017/0232335 A1* | 8/2017 | Williams | A63F 13/235 463/31 |
| 2017/0329748 A1* | 11/2017 | Li | G06F 3/017 |
| 2017/0365086 A1* | 12/2017 | Floyd | G06T 15/005 |
| 2018/0218005 A1* | 8/2018 | Kuhtz | G06F 8/44 |
| 2018/0329602 A1* | 11/2018 | Akeley | G06T 19/006 |

* cited by examiner

COLLABORATIVE MULTI-MODAL MIXED-REALITY SYSTEM AND METHODS LEVERAGING RECONFIGURABLE TANGIBLE USER INTERFACES FOR THE PRODUCTION OF IMMERSIVE, CINEMATIC, AND INTERACTIVE CONTENT

CROSS-REFERENCE TO RELATED APPLICATIONS

This application claims the benefit of U.S. Provisional Patent Application No. 62/553,127, filed Aug. 31, 2017, which is incorporated herein by reference in its entirety.

BRIEF SUMMARY OF THE DISCLOSURE

The disclosure is directed to collaborative multi-modal mixed-reality systems and methods leveraging reconfigurable tangible user interfaces for the production of immersive, cinematic, and interactive content.

In one embodiment, a method includes: initializing a virtual production application instance on a virtual reality (VR) client device; loading scene files and dependencies at the virtual production application; based on the loaded scene files and dependencies, rendering a virtual world for display by the VR client device; and the VR client device making changes to the scene files using a virtual media production tool rendered in the virtual world or a physical media production tool communicatively coupled to the VR client device.

In some implementations, the method further includes: receiving data corresponding to user input actuating a control of the physical media production tool; and registering the data with the virtual world. In some implementations, receiving data corresponding to user input actuating a control of the physical media production tool and registering the data with the virtual world includes: tracking movement of the physical media production tool using a motion sensor mounted on the physical media production tool; encoding the tracked movement; and transmitting the encoded tracked movement to the VR device for registration with the virtual world.

In some implementations, the VR client device includes a VR head-mounted display (HMD), the virtual world is displayed on the VR HMD, and the VR client device makes changes to the scene files using a controller communicatively coupled to the VR HMD. In these implementations, receiving data corresponding to user input actuating a control of the physical media production tool and registering the data with the virtual world may include: mounting the handheld controller on a mount coupled to the physical media production tool; tracking movement of the physical media production tool using a motion sensor of the mounted handheld controller; and registering the tracked movement with an object in the virtual world.

In some implementations, the physical media production tool includes: a video camera, a camera dolly, a camera crane, or a tripod, and the virtual media production tool includes: a corresponding virtual video camera, virtual camera dolly, virtual camera crane, or virtual tripod. In particular implementations, the physical media production tool includes a camera dolly, and receiving data corresponding to user input actuating a control of the physical media production tool includes moving the camera dolly along a dolly track, and registering the data with the virtual world includes registering the movement of the camera dolly to a virtual world spline attachment point.

In some implementations, registering the data with the virtual world includes: passing the data corresponding to user input actuating a control of the physical media production tool as an input to a node graph; and evaluating the node graph using the input.

In some implementations, the method further includes: displaying a user interface in the rendered virtual world for selecting a plurality of virtual media production tools; receiving data corresponding to user input at the controller of the VR HMD selecting the virtual media production tool; and instantiating and rendering the virtual media production tool. In further implementations, the method may further include: receiving data corresponding to user input actuating a virtual control for changing the state of the virtual media production tool; and making a corresponding change to a physical media production tool communicatively coupled to the VR HMD.

In some implementations, the method further includes: the client device transmitting the changes to the scene files to a server; and the server broadcasting the changes to the scene files to a plurality of other VR client devices to synchronize a virtual world rendered by the plurality of other VR client devices with the virtual world rendered by the client device.

In one embodiment, a system includes: a VR HMD; and one or more non-transitory computer-readable mediums having instructions stored thereon that, when executed by one or more processors, causes the system to: initialize a virtual production application instance; load scene files and dependencies at the virtual production application; based on the loaded scene files and dependencies, render a virtual world for display by the VR HMD; and the VR HMD making changes to the scene files using a virtual media production tool rendered in the virtual world or a physical media production tool communicatively coupled to the VR HMD.

In one embodiment, a method includes: consolidating scene files and dependencies at a master media production device; transmitting the consolidated scene files and dependencies from the master media production device to each of a plurality of VR client media production devices, where the plurality of VR client media production devices include a plurality of VR HMD; transmitting the consolidated scene files and dependencies from the master media production device to a server; each of the plurality of VR client media production devices loading the consolidated scene files and dependencies to a render a virtual world, where a view of the rendered virtual world is displayed by each of the plurality of VR HMD; and the server synchronizing across the plurality of VR client media production devices, any changes made to the consolidated scene files and dependencies by one of the plurality of VR client media production devices.

In some implementations, the changes may be synchronized in real-time by the server. In some implementations, the master media production device may transmit an instruction to each of the plurality of VR client media production devices to begin recording changes to the consolidated scene files and dependencies.

As used herein, the term "virtual reality" or "VR" generally refers to a simulation of a user's presence in an environment, real or imaginary, such that the user may interact with it.

As used herein, the terms "augmented reality," "AR," "mixed reality," and "MR" generally refer to a view of a physical, real-world environment that is augmented or supplemented by computer-generated or digital information such as video, sound, and graphics. The digital information may be directly registered in the user's physical, real-world environment such that the user may interact with the digital information in real time. The digital information may take the form of images, audio, haptic feedback, video, text, etc. For example, three-dimensional representations of digital objects may be overlaid over the user's view of the real-world environment in real time.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

Figure 1:
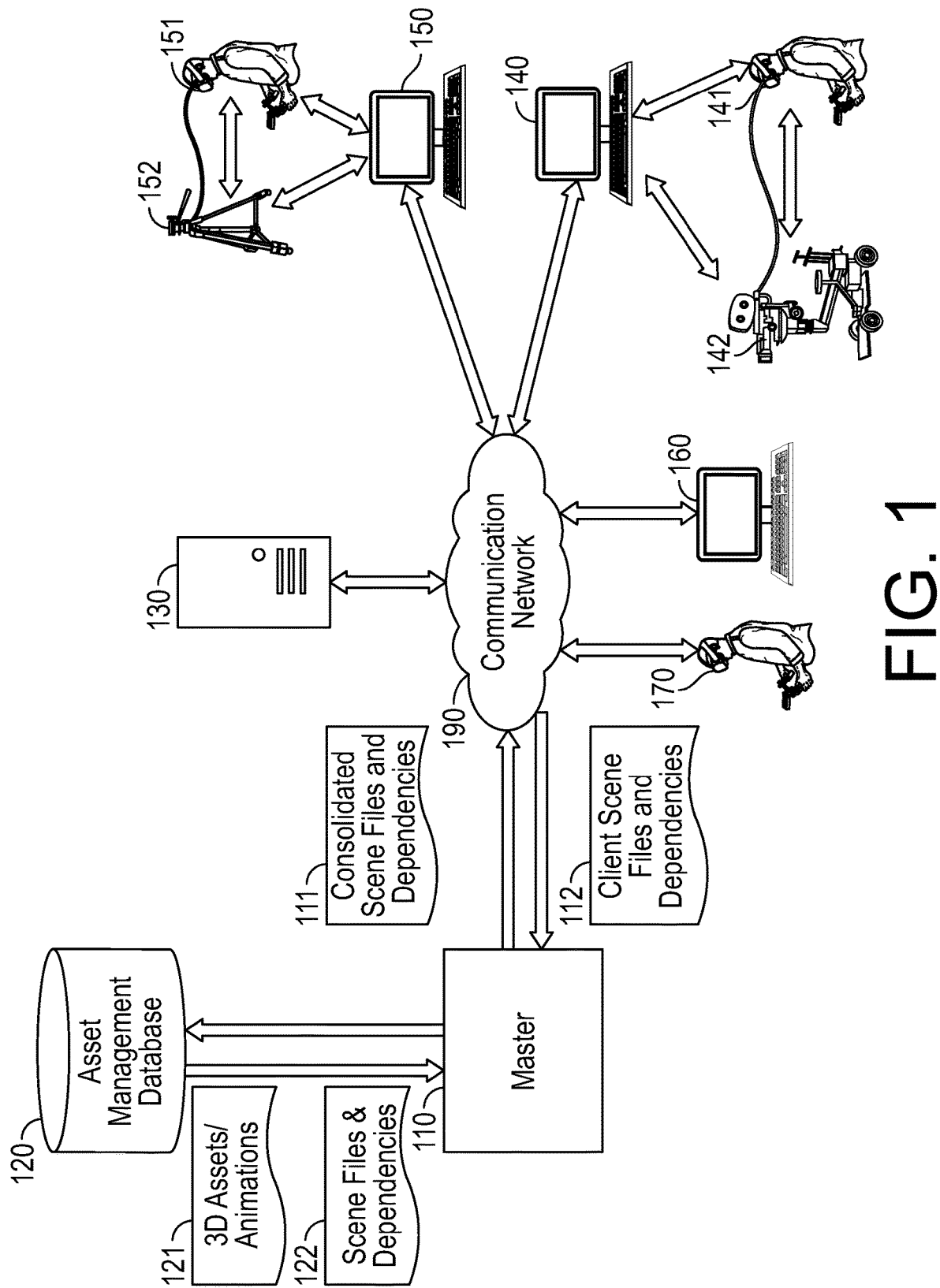
FIG. 1 illustrates an example virtual media production system in which embodiments described herein may be implemented.

The figures are not exhaustive and do not limit the disclosure to the precise form disclosed.

DETAILED DESCRIPTION

Creating content that is a mixture of live action media (e.g., photographs or footage of the physical world filmed with a camera) and computer generated imagery, has always been a challenge because of the difficulty of seeing these images combined into a "final" composite image in real time. This makes it difficult for users to view subjects "in context" or "as a complete picture." Previously, when producing visual effects for movies, for example, it was not possible to show the visual effects (computer-generated images to be added later) in concert with the live action footage. This required people to use their imaginations to visualize things that were not there, in order to film the portions of the final images they could see (the live action), with the trust that what they imagined (the visual effects) could be added later. The problem is that everyone imagines something different, and their rational minds had to assemble the final images conceptually, which hampered their ability to use their subconscious instincts and resulted in lower quality, or unnatural results. It also required an excessive amount of communication and coordination between large groups of people to arrive at a consistent visual result over a long period of time.

Furthermore, creating computer-generated content has been challenging because the interface for creating that content typically exists solely within a computer. People are typically limited to using computer monitors as a window into that virtual world, and using keyboards and mice as proxies for hands and physical presence. The computer user is required translate their knowledge of tools in the physical world, to the tools available in the computer, in order to accomplish similar tasks.

Embodiments described herein are directed to systems and methods that enable single users or multiple simultaneous users to create content (e.g., immersive, interactive, and/or cinematic video content) either as a mixture of live action media and computer generated media, combined together in context; or made up entirely from computer-generated media alone. The technology described herein may leverage physical and software-based user interfaces that merge and unite the physical world and the virtual world, which allows users to produce new forms of content with a user experience and user interactions that emulate traditional processes. The system may provide the ability to import, modify, manipulate, and/or animate objects in three-dimensional space, to change their appearance and function, and/or to record all changes and animations over time.

The systems and methods described herein allow both the physical world and the virtual world to use the same set of tools, such that users can see both worlds at the same time fused as one, without being forced to see that world through a monitor. Users may go inside the virtual world and bring their previous skills, tools, and knowledge with them from the physical world. When they come out of the virtual world, they may bring not only the media to create traditional film and television content, but also the data required to create instances of that virtual world that can be experienced or modified directly in other systems.

Embodiments described herein may be implemented as software running on a single or multiple connected personal computers. Users may engage with the system through a range of interfaces from "outside" in the physical world, to "inside" in the virtual world through a system of both hardware and software interfaces. The system may also have hardware input devices that are traditional film production equipment or user input devices which have been modified to transmit their functionality and position into the system. The system may also output a scalable number of viewpoints to display on devices ranging from virtual reality or augmented reality head-mounted displays to traditional television monitors or computer displays.

The outputs of the system disclosed herein may be video/audio recordings that are compatible with common video/audio hardware; data recordings (including positional tracking data, other sensor/input data, and interaction events) which can subsequently be imported into other 3D digital content creation software for further use or modification; and metadata which provides information about the data and how it was created and modified by the system.

FIG. 1 illustrates an example virtual media production system in which embodiments described herein may be implemented. As illustrated, the virtual media production system includes a central system or master 110, an asset management database 120, a synchronization server 130, and a plurality of client devices 140, 150, 160, and 170 that may communicate with master 110, other client devices, or synchronization server 130 over communication network 190.

Communication network 190 may comprise any communications network suitable for exchanging data between master 110, synchronization server 130, and client devices 140, 150, 160, and 170. It may include a combination of local area networks and a wide area network. For example, some client devices may be connected to the same local area network at the same site (e.g., in same building, sharing same router) whereas other client devices may be remotely located from each other (e.g., in different cities). Some non-limiting examples of protocols over which the devices may connect to a network 190 include: cellular telecommunications protocols, such as GSM, UMTS, CDMA2000, LTE, or WiMAX; wired communications methods, such as cable, DSL, dial-up, or fiber-optic; or wireless communications methods, such as satellite communications or WiFi.

In implementations, client devices 140-170 may include desktop computers, laptop computers, mobile devices such as tablets or smartphones, head mounted displays (e.g., HMD 170), and other suitable devices for production of virtual assets such as animated movies or shows, video games, and animated assets that are rendered in live action video. During virtual media production, client devices 140-170 may be triggered to perform certain actions at the request of master 110. For example, master 110 may instruct the clients to go to a certain moment in time, or load/unload a certain scene file, and/or start recording the changes that are being made. It may also trigger external A/V recorders to start recording video and audio signals being broadcast from selected devices in the network.

As illustrated in the example of FIG. 1, some client devices (e.g., client device 160) participating in the virtual production may configured as computers having a conventional interface (e.g., monitor that provides window into virtual world/animated assets). Other client devices may be configured as a VR HMD (e.g., HMD 170), tethered or untethered, with handheld controls that allow the user to experience and interact with the virtual world through a VR interface. For example, the VR HMD client devices may permit a user to act as a puppet in the scene in order to provide original performance to a character that is recorded.

Some client devices may be configured as VR systems that connect a user of a VR HMD with a physical media production tool. For instance, a VR HMD 151 that is tethered to a desktop computer 150 may be connected to a tripod tool 152, and a VR HMD 141 that is tethered to a desktop computer 140 may be connected to a dolly tool 142. Alternatively, VR HMD 141 and 151 may not be tethered. As further described below, this configuration (connection of VR HMD with a physical media production tool) may permit a user participating in the virtual media production to leverage a user interface that merges and unites the physical world and the virtual world by using the same set of media production tools/controls in both the physical world and virtual world to create virtual content (e.g., an animated video or video game), without being forced to see that world through an external monitor. For example, a user viewing a virtual world through HMD 141 may actuate physical controls of dolly 142, and observe those actuations being registered with a virtual dolly shown in the virtual world. Conversely, the user may also actuate a virtual control of the virtual dolly, and those actuations may be applied to the physical dolly 142.

Figure 2:
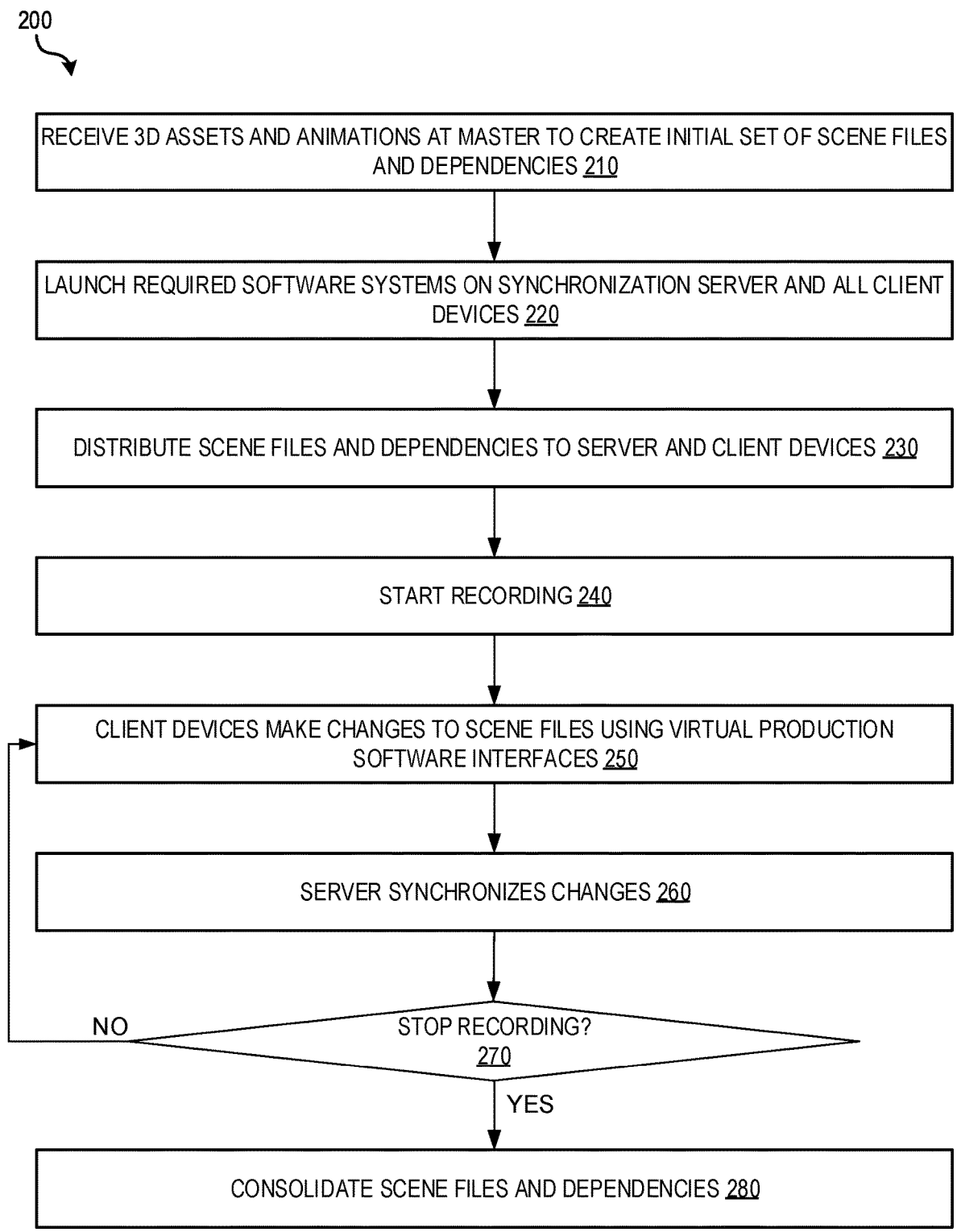
FIG. 2 is an operational flow diagram illustrating an example virtual media production process flow that may be implemented by the system of FIG. 1 to edit and/or create virtual media content in accordance with embodiments.

FIG. 2 is an operational flow diagram illustrating an example virtual media production process flow 200 that may be implemented by the system of FIG. 1 to edit and/or create virtual media content. At operation 210, master 110 may receive 3D assets and animations 121 to create an initial set of scene files and dependencies corresponding to a virtual world or "scene." For example, master 110 may ingest 3D assets and animations from an asset management database 120, and use those to generate scene files. In some implementations, master 110 may also receive an initial set of scene files and dependencies 122 from database 120 or other clients on the system.

At operation 220, the software systems required for virtual production may be launched on synchronization server 130 and all client devices 140-170 in configuration sets which enable the server 130 and client devices 140-170 to perform their expected functions with consistent data sets across all machines. For example, master 110 may launch virtual production software interfaces on client devices 140-170.

At operation 230, the scene files and dependences (e.g., scene files and dependencies 111) may be distributed to synchronization server 130 and client devices 140-170. For example, commands may be issued from the master 110 to push scene files and their dependencies across communication network 190, which may be on a LAN or a WAN.

Following launch of the necessary software systems and distribution of the scene files, master 110 may monitor that all the client devices are performing as expected. Additionally, master 110 may monitor that all client devices are configured to play the appropriate "roles" in the system. Depending on the desired user requirements for creating a particular form of new content, the virtual production application of each of the clients 140-170 may be configured to support certain functionalities grouped into "roles", such as, for example, "Camera" "Crane" "Dolly" "VR User" "Puppet" "Video Village." In this example, the terms for these roles are inherited from tradition, and represent their physical world functional equivalent. Each of these clients may appear in the virtual world together, with the ability to perform their unique functions, and to move freely around in the virtual world to the user's discretion. Some of these clients may represent humans in the physical world, and some may represent unique pieces of hardware in the physical world, which may be operated by humans, or may be autonomous.

By way of example, a "VR User" may represent a human who is wearing a VR HMD (e.g., HMD 170) and using hand controllers in the physical world. In the virtual world, the user may be represented as an avatar which is user customizable, but can indicate a variety of unique information about that user, such as name, where they are in the virtual world, what they are looking at, where their hands are, what they're pointing at, and what tools they are using.

A VR User may have access to a Virtual Menu System that they may summon within the virtual world, which contains a variety of tools they may select to use, and parameters that can affect the world for everyone, or only their view of it. They also may have a series of navigation tools that allow them to freely move in all axes of the virtual world, at varying speeds, and find, and/or transport to, other users, equipment, or key points in the virtual world. They may also be presented with an indication of the scene name, and other relevant information that gives them context for organizational information they will use to track their progress in creating content, and their relationship to previous or future work in the system.

A VR user may choose a tool called a "Viewfinder" that gives them a representation of the field of view (FOV) through a traditional camera lens in the form of a virtual monitor attached to their hand. If they fly to a location they'd like to place a virtual camera, and compose a "shot" they would like to capture, they can press a button and a virtual representation of a traditional physical camera may appear at that place. That "virtual camera" may then appear to all other users of the system, and can be assigned to another computer on the network for further management and modification by other devices.

Additionally, as further described below, the VR user may, through the registration of the system between the physical world and the virtual world, operate virtual media production tools that are correlated to physical media production tools in the real world. For example, if the VR User determines that they would like to operate the virtual camera on a tripod, they may select a tripod from the Virtual Menu System and through the registration of the system between the physical world, and the virtual world, a tripod will appear in the virtual world, which is correlated relative to the user through a variety of "tracking systems" with a tripod 152 in the physical world.

Objects in the scene which contain time-dependent information may also be represented in a timeline interface which shows the changes that an object undergoes over time. For example, a driving car in a scene may contain animation tracks in the timeline which represent its path and speed through the scene with as much detail as required, so that it can be modified or offset within the system.

Another VR User may choose to become a puppet in the scene in order to provide original performance to a character which will also get recorded. If a scene contains a character (human, animal, vehicle, etc.) which has been rigged and/or provided with a state machine of animation cycles, the VR User may select it in the virtual world, and choose to "possess" it. At that point, the VR User may align with the character relative to its position, and take control of the character's ability to walk, run, fly, or move through the scene through whichever means appropriate to that character. The individual parts of the character may be separately controllable so that a character may be performed by one or more VR Users (e.g., User One, may control the puppet's body movement through the scene, while User Two might control its facial performance and head movement separately from another computer). There are many means that may be made available to the puppeteer to control these puppets. They may be experienced by the user as a "first person" view where they "inhabit" the puppet's body virtually such that when the user's head moves, the puppet's head moves in perfect sync. If the user walks around the physical world, the puppet may follow them in sync in the virtual world. Correlation between the physical world and the virtual world to drive puppeteering can leverage an array of physical devices, from game controllers, other computer input devices, or optical tracking devices such as motion capture, VR tracking, inertial motion capture, encoded mechanical equipment, or custom purpose-built devices.

In order to facilitate users who are observing the system from the physical world, some devices (e.g., device 160) may be designated with roles such as "video village," which will stream an observation from within the system out via standard video broadcast signals so they can be streamed to A/V record devices, TV monitors, and other traditional media formats. Because these systems have less stringent playback frequency requirements, it is possible to configure the scene representations in these systems with high quality calculations that reduce the possible frequency that those machines can generate representative imagery. This means that computationally expensive options such as ray-traced lighting, and lens defocus may be enabled which would be unacceptable to users in a VR environment where human biological requirements desire a higher rate of visual refresh.

As would be appreciated from the foregoing description, the client devices 140-170 may be configured to perform a variety of roles within the virtual production system, where the roles represent a physical world functional equivalent and may be performed by interacting with the virtual world. Once those clients have been configured with roles (e.g., a user, puppet, a device controlling VR representation of a camera, and/or other roles), and there is a scene with animations, the system may proceed to record a sequence of events comprised of new animations and positions driven by the system. This may be referred to as a "take."

Referring back to method 200, for example, at operation 240, master 110 may instruct the clients to start recording changes that are being made to the system. For example, the changes may be recorded in the form of keyframes in a timeline. These keyframes may be sampled at a moment in time coordinated by the synchronization server 130 and represent the values of specific parameters (such as X, Y, Z, or rotation values) at that moment in time. Master 110 may additionally issue a command that triggers video record decks which have as their input the output of selected points of view in the virtual world, which may be cameras, point of view of users, or any visual data. All connected systems, including video hardware and computers, may confirm with the master 110 that they have begun recording. When it has been confirmed that all desired system components are recording, an "action" or "play" command may be issued, which triggers any pre-recorded animations to play in sync with all machines.

At operation 250, the client devices may make changes to scene files using virtual production software interfaces. For example, once the master 110 issues a command to start recording changes that are being made, any users of the system may contribute their live performances, whether a camera operation, a puppeteer, or a pre-animated object within the scene.

Once all the computers on the network have local copies of the scenes and parity and configurations have been confirmed, the server 130 may take over communication to all the client computers on the network and act as the primary source of synchronization for the multi-user, multiple-device system. As such, at operation 260, the server may synchronize any changes that are made to the system by the client devices. In some implementations, the server 130 may broadcast synchronization signals. In some implementations, changes to the system may be synchronized using a time code generator and generator locking. For example, the recorded changes to a scene file may include timecodes that are generated by a GPS unit that receives calibrated time signals.

As different operations in the network may have different prioritizations for synchronization, there may exist several different network protocols for synchronization between clients and server. Operations which are highly dependent on maintaining synchronization between clients can be designated to use higher performance protocols such as User Datagram Protocol (UDP) or Multicasting. If using a UDP or multicast protocol, the transmission of synchronization data may be sent simultaneously to all computers and devices in the network, rather than being passed through the server first, in order to ensure the fastest transmission and receipt of the data possible. Other operations where confirmation of receipt or order of receipt, is more critical than speed of receipt may use Transmission Control Protocol/Internet Protocol (TCP/IP). Such varying protocols may be used simultaneously without conflict, and other industry standard network protocols, or custom protocols may be used as well. The synchronization signal, or time-code, may be used across devices during recording to ensure that what was observed by the users is what is recorded by the server.

Operations 250-260 may be iteratively repeated until a stop command is issued (decision 270).

When the desired sequence of events has completed, the user of master 110 may issue a "stop" command (decision 270). At operation 280, in response to the stop command, scene files, recorded animations, and dependencies may be consolidated. A stop command may trigger a series of post-record actions that consolidate the unique recordings of animated events from all the computers and devices in the system and collects them into a package that allows that performance to be reconstructed in the system, and exports them to a central file system, or an external database (e.g., database 120) which tracks all these dependencies and allows them to be recreated in external digital content creation systems. The master 110 may also collect copies of video and audio recordings from externally-connected A/V equipment for reference. To optimize this process, the post-record process may compare the load state of the data into the system, with the post-record state and only save/export items which have changed from their load state. The consolidated scene files and dependencies may be used during a subsequent virtual production process to make further modifications during future "takes" by performing operations 230-280.

Although method 200 has been described in the context of a system that synchronizes user changes during a recording (operations 240-260), it should be noted that operations 250-260 may be performed during periods where there is no recording (e.g., before recording has begun or after it has stopped). For example, once scene files and dependencies are distributed to the server and client devices (operation 230), the client devices may begin making changes to the scene files using virtual production interfaces and the server may synchronize these changes (e.g., as described above with reference to operations 250-260) without a recording event.

Figure 3:
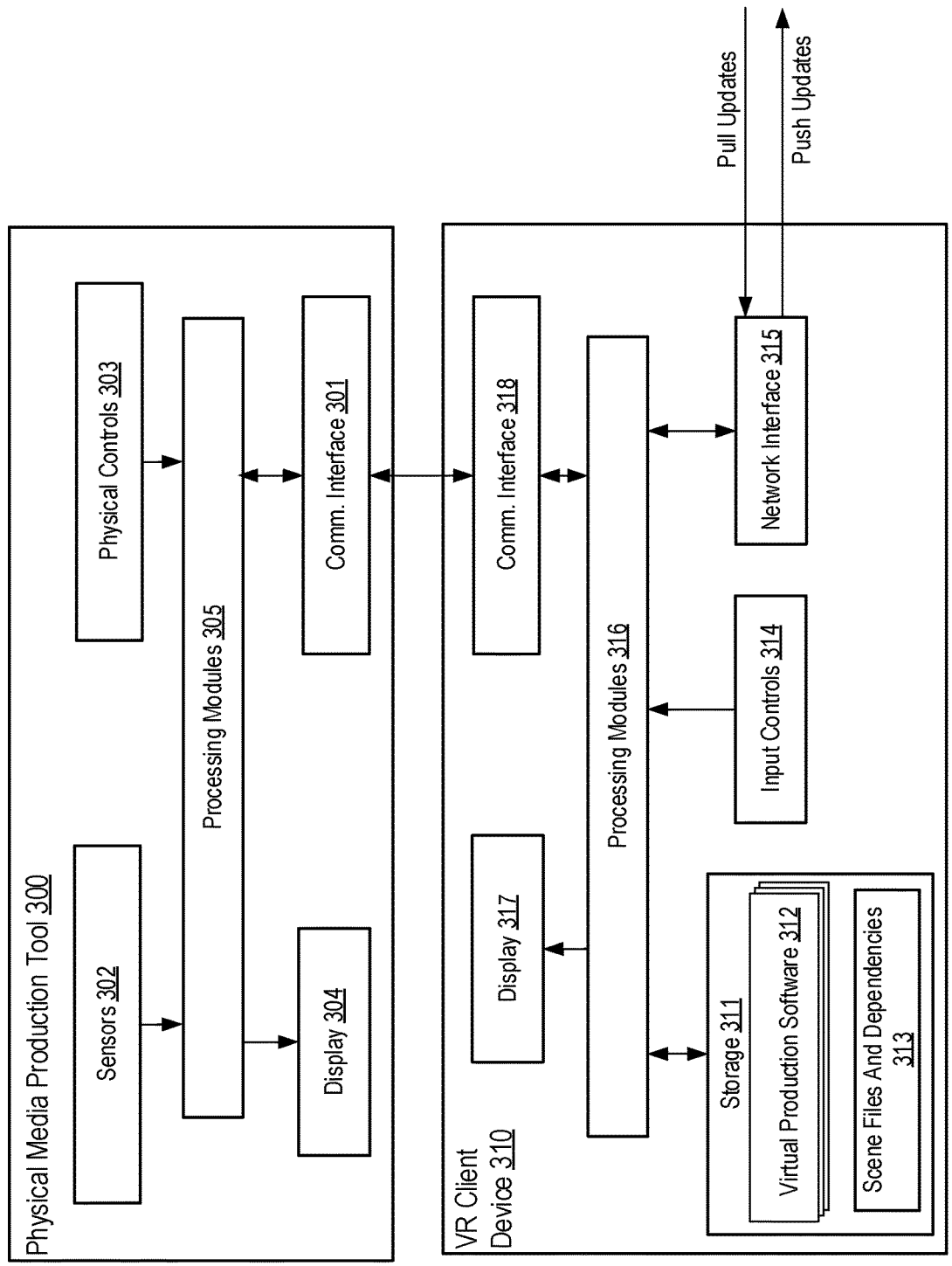
FIG. 3 is a block diagram illustrating an example architecture of a VR client device in communication with a physical media production tool in accordance with embodiments.

FIG. 3 is a block diagram illustrating an example architecture of a VR client device 310 in communication with a physical media production tool 300 in accordance with embodiments. The physical media production tool may be, for example, a camera, a tripod, a camera dolly, a camera crane, or some combination thereof. The VR client device 310 may be, for example, a tethered or untethered VR HMD, or other device that can display a view of a rendered VR world. For example, physical media production tool 300 may correspond to dolly 142 or tripod 152, and VR client device 310 may correspond to tethered desktop computer 140 and HMD 141 or tethered desktop computer 150 and HMD 151.

Physical media production tool 300 may include sensors 302, physical controls 303 (e.g., knobs, dials, levers, buttons, touch controls, optical zoom actuators, etc.), one or more processing modules 305, and a communication interface 301 that it uses to pass information to or receive information from VR device 310. In implementations where VR client device 300 includes a VR HMD, optional display 304 may display the view of the virtual world that is displayed on the HMD. For example, video information received from VR client device 310 over communications interface 301 may be passed to display 304.

The sensors 302 may include one or more position sensors (e.g., accelerometers, gyroscopes, magnetometers, etc.), optical sensors, or other sensors that track the movement and position of the physical media production tool 300. During virtual media production, electrical signals generated by these sensors may be processed by a processing module 305 to track the movement of the physical media production tool 300 and determine its absolute orientation (e.g., in the north-east-south-west and up-down planes or rotation). This information may be transmitted to VR device 310 over communication interface 301 to register the physical media production tool 300 with a virtual media production tool rendered in the virtual world displayed by VR device 310. In other implementations, sensors of an input control 314 of VR client device 310 may be utilized in place of sensors 302. For example, sensors 302 may be position sensors of a handheld controller that is mounted on the physical media production tool 300 and communicatively coupled to a VR HMD.

Communications interface 301 (and communications interface 318) may include a physically wired communications interface such as a USB type-C interface, a USB 3.0 or higher interface, a thunderbolt interface, an HDMI interface, an Ethernet interface, or some combination thereof. In some implementations, physical media production tool 300 and VR device 310 may also connect using a wireless connection such as an ad-hoc radio frequency connection.

VR client device 310 may include a communications interface 318, a display 317 (e.g., a display of a VR HMD), one or more processing modules 316, a storage 311, input controls 314 (e.g., VR HMD handheld controllers, a keyboard, a mouse, a touchscreen, etc.) and a network interface 315.

Network interface 315 may push and pull updates relating to the virtual media production (e.g., changes to scene files or dependencies) received from other devices (e.g., client devices, master, or synchronization server) on the communication network (e.g., over network 190). In implementations, network interface 315 may be implemented as a network interface controller or cellular transceiver.

Storage 311 may comprise volatile memory (e.g. RAM), non-volatile memory (e.g. flash storage), or some combination thereof. Storage 311 may store virtual production software 312, that when executed by processing module 316 (e.g., a digital signal processor), generates a VR view of a virtual world on display 317. The virtual world may generated using scene files and dependencies 313 that are loaded from memory as discussed above with reference to FIG. 3.

Figure 4:
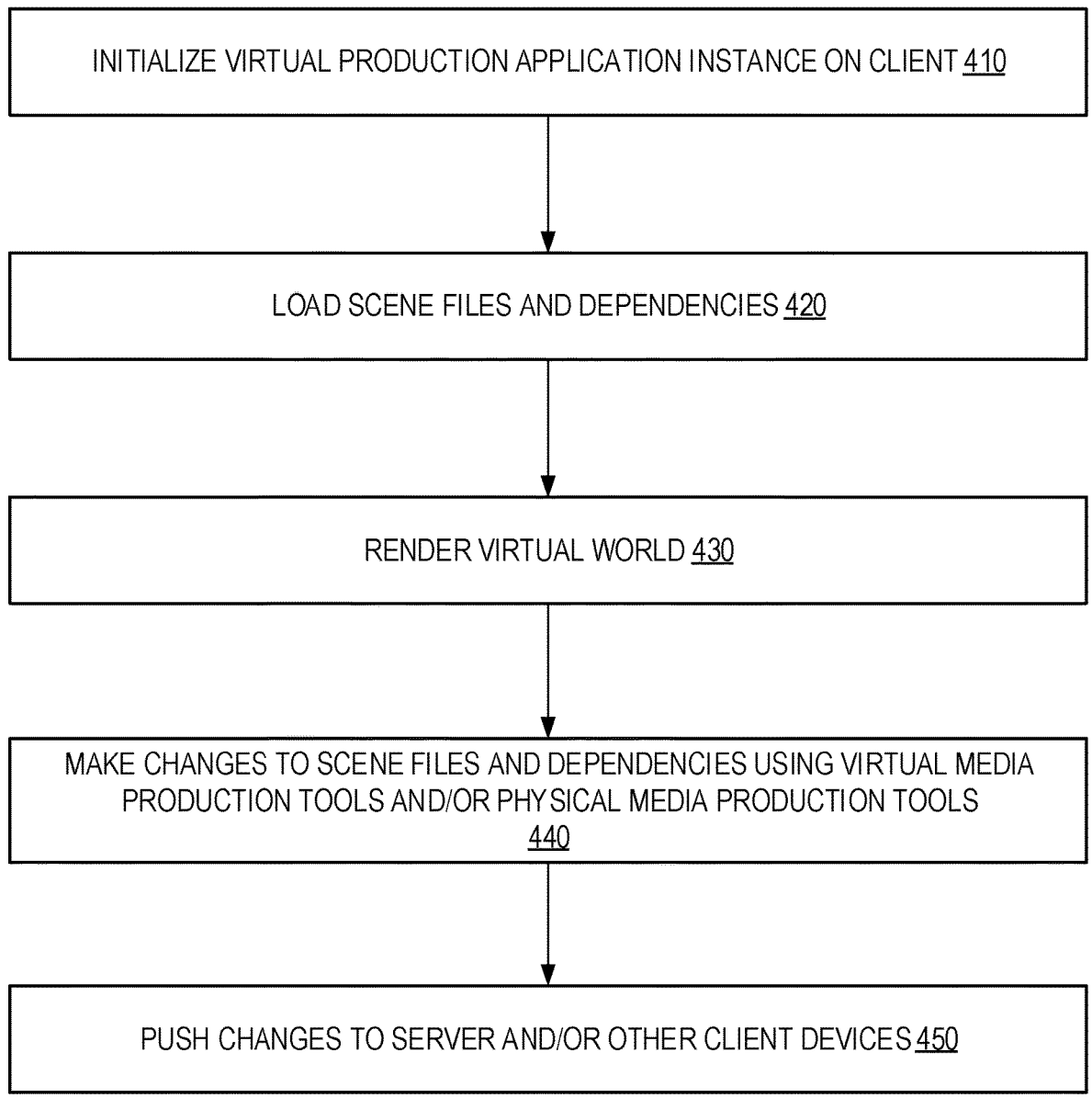
FIG. 4 is an operational flow diagram illustrating an example method that may be implemented by a client device of the system of FIG. 1 to create or modify virtual assets in accordance with embodiments.

FIG. 4 is an operational flow diagram illustrating an example method 400 that may be implemented by a client of the system of FIG. 1 to create or modify virtual assets in accordance with embodiments. At operation 410, the client may initialize a virtual production application instance (e.g., using a virtual production application such as software 300 that is launched during process 200). At operation 420, the client may load the scene files and dependencies (e.g., scene files and dependencies 313) associated with the virtual production. For example, the client may load consolidated scene files and dependencies received from the master 110 in preparation for further editing of those files. At operation 430, the loaded scene files and dependencies may be used to render a virtual world (e.g., a virtual world corresponding to an animated film or video).

At operation 440, the client may update or create scene files by using virtual media production tools rendered in the virtual world, by using physical media production tools with interfaces that communicatively couple the controls of the physical media production tools to the virtual world, by using controls that allow the client to behave as a "puppeteer," and/or by using other controls that are provided as part of a virtual production application. For example, the client may render 3D objects within the virtual world, change the appearance or position of 3D objects within the virtual world, place and configure virtual media production tools within the virtual world, change the lighting of the virtual world, convert data corresponding to inputs at a physical media production tool to an input in the virtual world, etc. Specific methods of implementing operation 440 using corresponding physical and virtual media production tools are further described below with reference to FIGS. 5-11.

At operation 450, any changes made to the scene files and dependencies may be pushed by the client to a synchronization server 130 and/or other clients. For example, for any change made to any device in the system, the present state of that device (whether virtual or physical, or a combination of both) may be broadcast to the server 130 and other clients in the system so that its representation and functionality may be in synchronization between all users and devices. Certain data synchronizations may be routed first to the server 130 and then re-broadcast, in order to register them with more specific control, while others may be broadcast to all clients simultaneously to accept updates on an "as available" basis rather than a "must have" basis.

Figure 5:
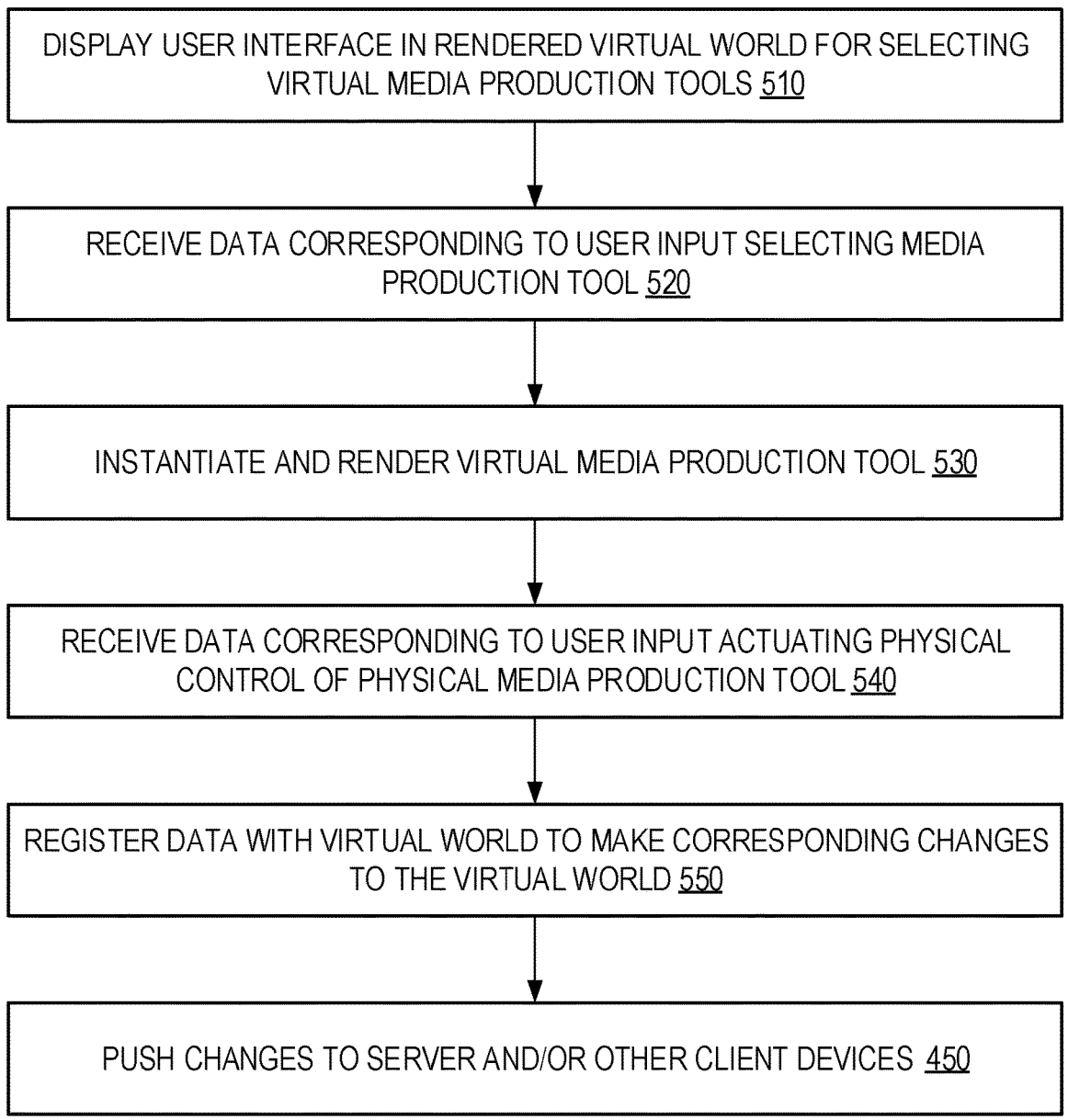
FIG. 5 is an operational flow diagram illustrating an example method that may be implemented by a VR client device in communication with a physical media production tool to update or create scene files using a virtual media production tool rendered in the virtual world.

FIG. 5 is an operational flow diagram illustrating an example method 500 that may be implemented by a VR client device 310 in communication with a physical media production tool 300 to update or create scene files using a virtual media production tool rendered in the virtual world. Prior to implementing method 500, a virtual world may be rendered as discussed above with reference to operations 410-430 of method 400.

At operation 510, a user interface for selecting virtual media production tools may be displayed in a rendered virtual world (e.g., a virtual world rendered by loading scene files and dependencies). The user interface may be summoned in response to user input at the VR client device 310 (e.g., by actuating one more handheld controls of a HMD). The user interface may be displayed as a virtual menu system containing a variety of virtual media production tools that may be selected for use. Additionally it may display modifiable parameters that can affect the VR world for other users in the virtual production or only the current user.

Figure 6:
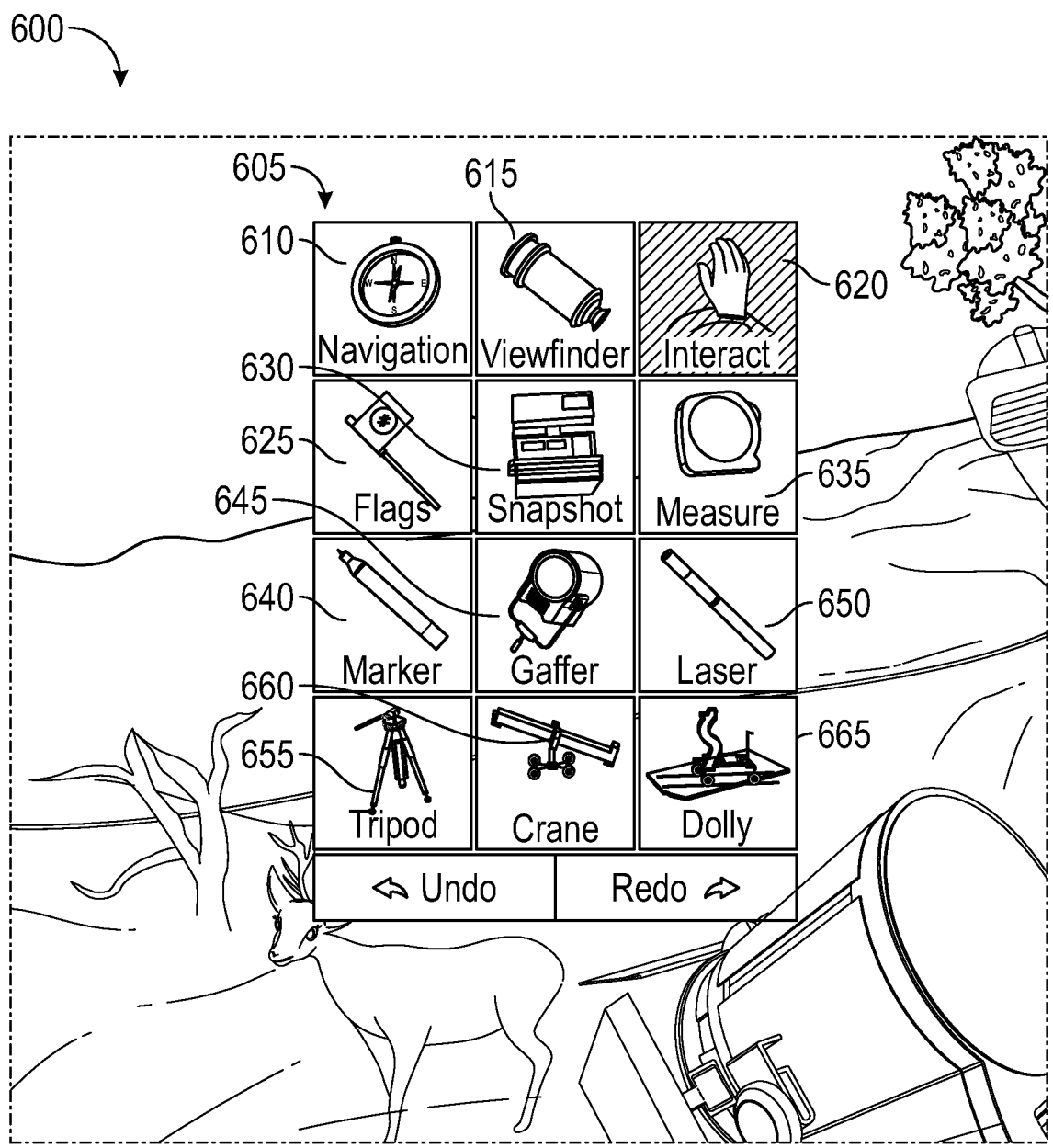
FIG. 6 illustrates an example of a rendered virtual world, including a virtual menu system, that may be displayed to a user in accordance with embodiments.

FIG. 6 illustrates one such example of a virtual menu system 610 that may be displayed to a user within a rendered virtual world 600 in accordance with embodiments. As illustrated, the virtual menu system 605 may include one or more navigation tools 610, a viewfinder tool 615, an interaction tool 620, a flag tool 625, a snapshot tool 630, a measurement tool 635, a marker tool 640, a gaffer tool 645, a laser tool 650, a tripod tool 655, a crane tool 660, and a dolly tool 665. As further described below, some of these virtual media production tools (e.g., viewfinder tool 615, tripod tool 655, crane tool 660, and dolly tool 665) may be used with corresponding real-world physical media production tools to create virtual content.

Figure 7:
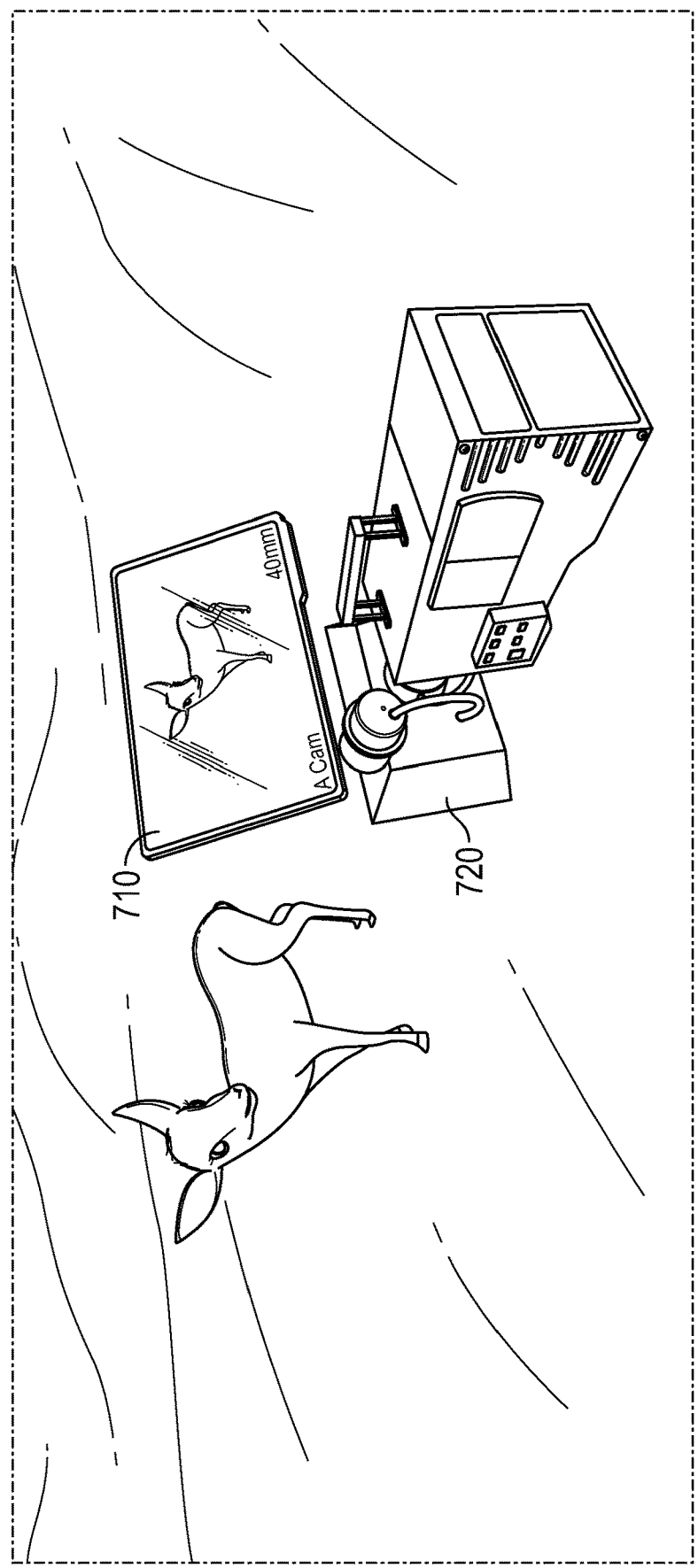
FIG. 7 illustrates an example of a virtual viewfinder that may be instantiated and rendered by selecting the viewfinder tool of the virtual menu system of FIG. 6.

At operation 520, the VR production interface may receive data corresponding to user input selecting one of the displayed media production tools. At operation 530, the selected virtual media production tool may be instantiated and rendered in the virtual world. By way of example, FIG. 7 illustrates an example of a viewfinder 700 that may be instantiated and rendered by selecting the viewfinder tool 615 of the virtual menu system 605 of FIG. 6. As illustrated, the viewfinder tool provides a representation of the field of view (FOV) 710 through a traditional camera lens in the form of a virtual monitor attached to the user's hand (e.g., VR HMD handheld controller). Additionally, the viewfinder tool may permit the user to create a virtual representation 720 of a traditional physical camera that may be assigned to another computer on the network for further management and modification by other devices.

Figure 8:
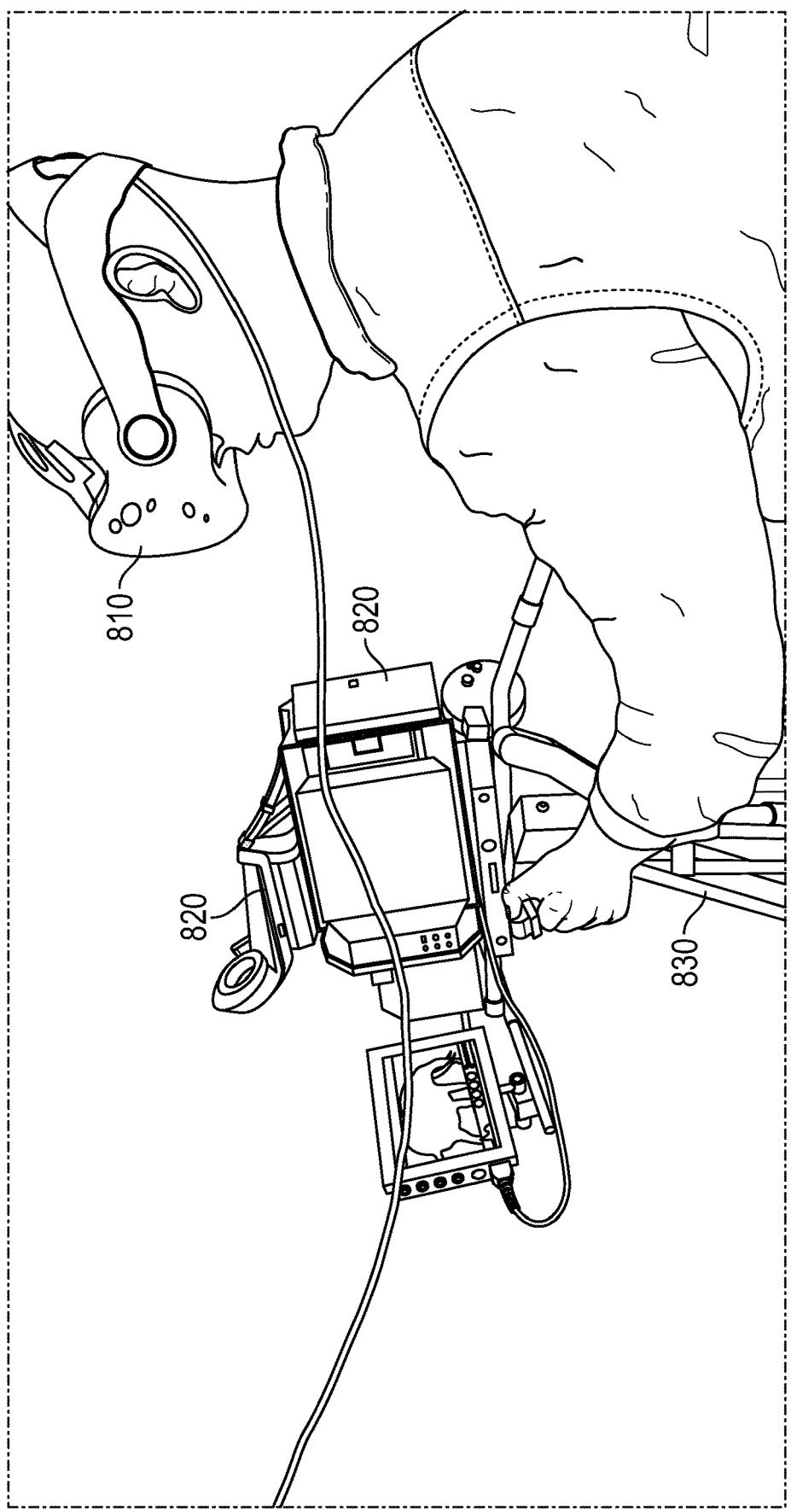
FIG. 8 illustrates a physical camera mounted on a tripod that is communicatively coupled to a VR HMD and may be registered with the virtual world of FIG. 6, in accordance with embodiments.

Virtual representation 720, in implementations, may be associated with a physical camera (a physical media production tool) that may be communicatively coupled to the VR device of the user that created virtual representation 720 or to another user's VR device. FIG. 8 illustrates on such example of a physical camera 820 mounted on a tripod 830 that is communicatively coupled to a VR HMD 810.

At operation 540, the VR software production interface may receive data corresponding to user input actuating a physical control of a physical media tool. By way of example, consider the environment of FIG. 8. The user wearing the VR HMD 810 may reach out and touch in the physical world, tripod 830, and operate the camera 820 (e.g., adjust its focal length and pointing direction) to compose a shot. Data corresponding to all changes made to the tripod 830 and/or camera 820 may be transmitted to the VR HMD 810 (or a computer it is tethered to) so that these changes may subsequently be reflected in the virtual world as further described below with reference to operation 550. As alluded to above, this may involve optical tracking, electro-mechanical encoding, or a variety of other methods passing signals into the computer from the device to ensure that changes to the physical world, will be represented in the virtual world.

At operation 550, the received data corresponding to user input of the physical media product tool is registered with the virtual world to make corresponding changes to the virtual world. For example, any changes that are applied to tripod 830 and/or camera 820 may be registered with an instantiated virtual camera and/or tripod.

In embodiments, a node graph may be used to register changes between physical media production tools and objects (e.g., virtual media production tools) in the virtual world. For example, any changes that are made to a physical media production tool may be received as data inputs to the node graph, and the node graph may be evaluated with those inputs to apply the changes to the virtual world. In order to facilitate simple connection between physical world objects and virtual world objects in a manner that is flexible, fast, and easy to understand, a node-based input manager system may manage one or more node graphs and act as a "signal patch bay" that allows signals from physical world objects to be routed to any of their virtual counterparts, with the flexibility to introduce transformations, or processing to the data streams as they connect. For example, if there is a physical world knob that represents a cinematography focus puller's device, that object can be encoded and values from the encoder can show up as an available data source in the input manager, so that it may be wired to a focus tool that exists in the virtual world. Additionally, the two "ends" of the rotation of the knob may be wired to two characters in the scene. When the knob is pulled all the way in one direction, the focus of the virtual camera may find the distance of Character 1 and ensure they are in focus. If knob is turned to the opposite end of rotation, the focus may travel to Character 2. A variety of preset transformations, formulas and matrices may be implemented to modify the data streams, allowing a quick bi-directional modification to the data flow in real time.

Any changes that are registered with the virtual world through registration of the physical world inputs may be pushed to a synchronization server and/or other client devices as discussed above (operation 450).

Figure 9:
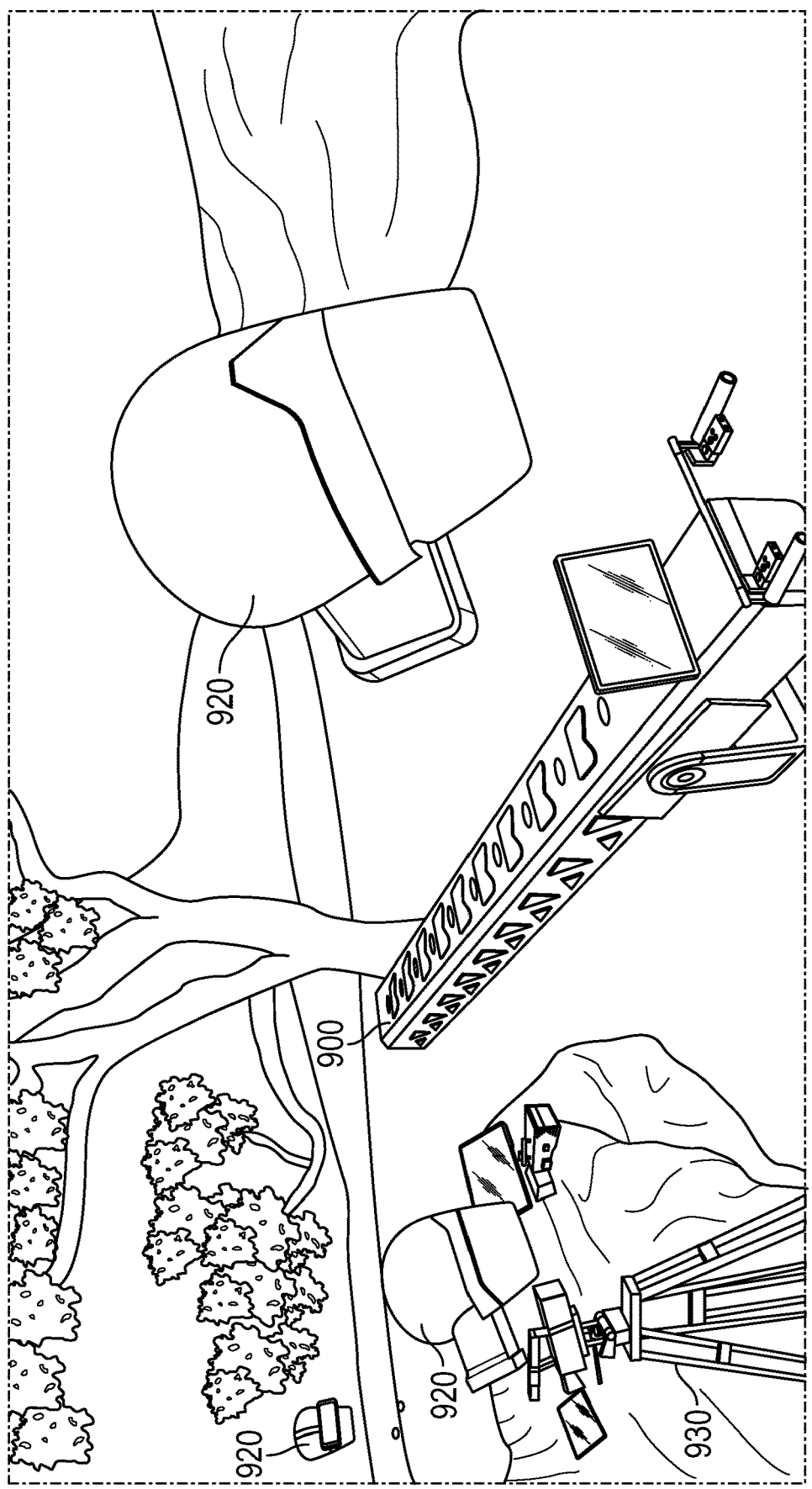
FIG. 9 illustrates a real-time collaboration of users in the virtual world of FIG. 6 and an example of a virtual camera crane that may be instantiated and rendered by selecting the crane tool of the virtual menu system of FIG. 6, in accordance with embodiments.
Figure 10:
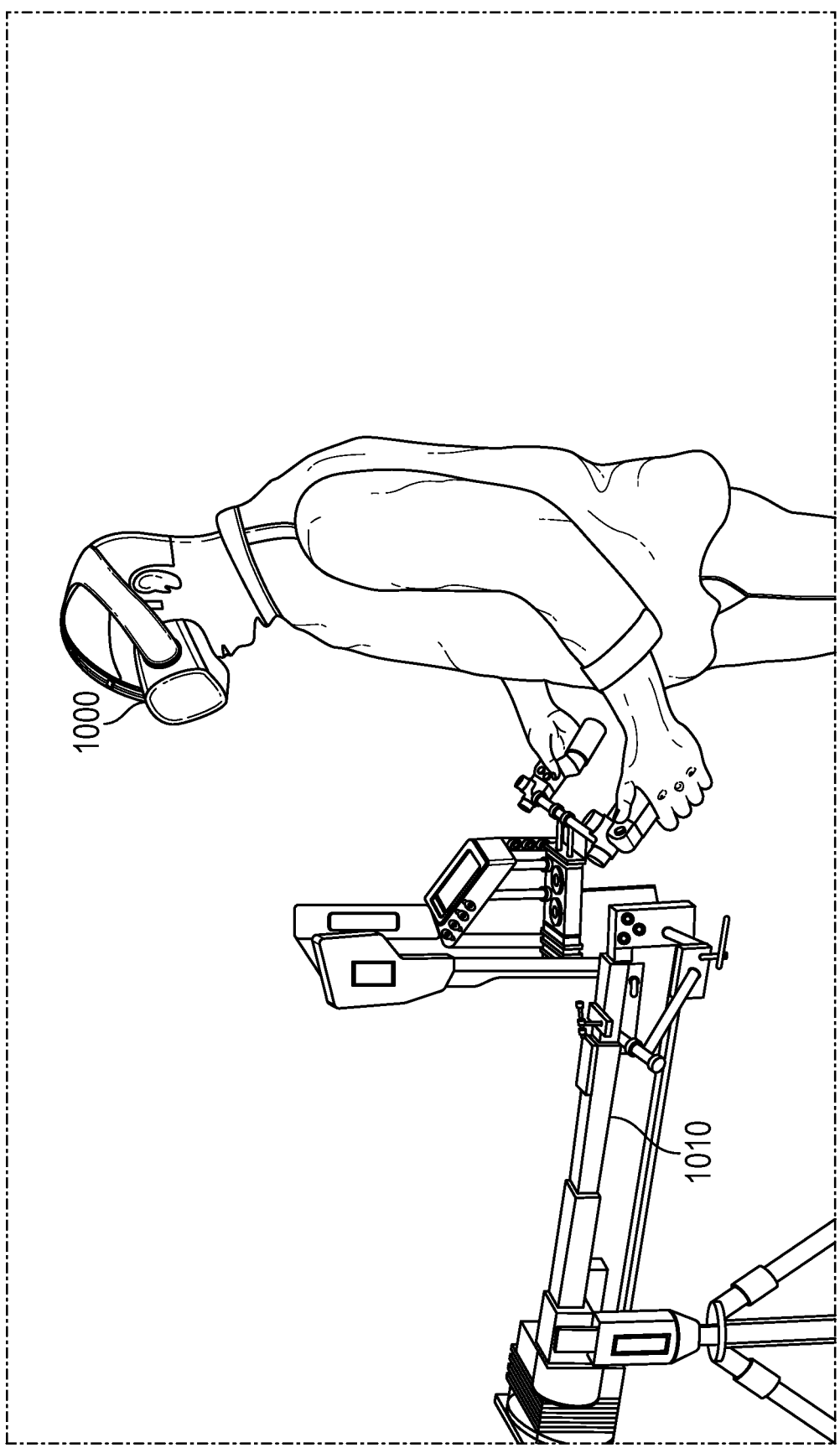
FIG. 10 illustrates a physical camera crane that is communicatively coupled to a real world VR HMD and may be registered with the virtual camera crane of FIG. 9, in accordance with embodiments.

FIG. 9 illustrates an example of a virtual crane 900 that may be instantiated and rendered by selecting the crane tool 660 of the virtual menu system 605 of FIG. 6. In the example virtual world of FIG. 9, a plurality of virtual users 920 collaborate in real-time during virtual production. For example, a second virtual user operates a virtual tripod 930 mounted with a virtual camera, and a third virtual user utilizes the controls of a VR HMD without a virtual media production tool. The virtual users operating the virtual camera crane 900 and tripod 930 may be associated with a real world user wearing a VR HMD that is communicatively coupled to a real world crane or tripod. For example, FIG. 10 illustrates a user of a real world VR HMD 1000 that is communicatively coupled to a physical camera crane 1010.

As the foregoing description illustrates, by providing a POV to a user within the VR world that reacts to user input to equipment in the physical world, the technology described herein may be used to seamlessly bridge the gap between the physical world and the virtual world. Users that have many years of experience operating physical equipment in the real world may more easily "operate" the same equipment in the virtual world despite have limited to no experience working with computer generated imagery/animation. For example, users that customarily operate camera dollies and gaffers in the real world to shoot live action scenes may wear a VR HMD and perform their jobs in the virtual world to create computer-generated content such as animated films or video games.

Additionally, the technology disclosed herein may be implemented to create computer-generated content for augmenting live action films. By way of example, a tracking sensor may be attached to a live action camera that is used to film live action characters, and the tracking sensor may feed into a virtual production system the exact coordination, location, orientation, and FOV parameters of the camera in the physical world and then create a virtual camera inside of the virtual world that matches those parameters. What the camera "sees" in the virtual world may then be composited or layered on top of video stream coming from the physical world.

Figure 11:
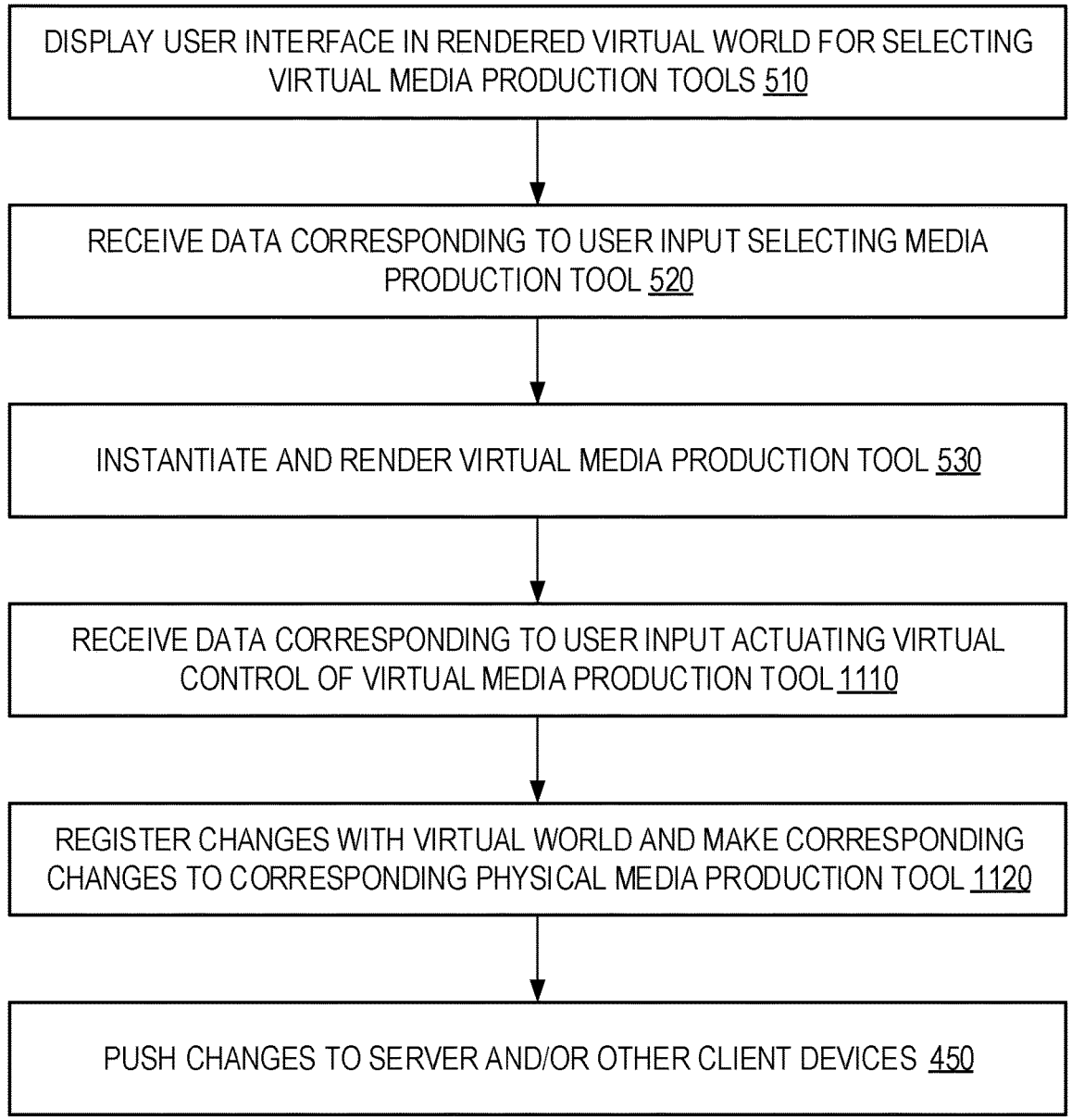
FIG. 11 is an operational flow diagram illustrating an example method that may be implemented by a VR client device in communication with a physical media production tool to makes change to the physical media production by making changes to a virtual media production tool rendered in the virtual world.

Just as physical media production tools in the real world may be used to influence virtual media production tools in the virtual world, virtual media production tools in the virtual world may be used to make changes to physical media production tools. FIG. 11 is an operational flow diagram illustrating one such example method 1100 for making those changes. In method 1100, once a virtual media production tool has been instantiated and rendered in the virtual world, at operation 1110, data may be received corresponding to user input actuating a virtual control of the virtual media production tool. For example, the focal length of a virtual camera may be increased or decreased. At operation 1120, the received data may be registered with the virtual world to make changes to it. Additionally, the received data may be used to make corresponding changes to a corresponding physical media production tool. Using a physical camera as an example, if the focal length of the virtual camera is increased by 20 mm, then the same corresponding change may be made to the physical camera using a zoom lens. In some instances, the same node-based input manager system described above may manage one or more node graphs and act as a "signal patch bay" that allows signals from virtual world objects to be routed to any of their physical world objects.

Referring again to FIG. 6, in order to facilitate robust operation there are a variety of tools in the virtual system which may allow users in the virtual world to perform functions with parity to their physical world counterparts. From within the system, pressing a button may invoke a Virtual Menu System 605 that appears in front of the user using skeuomorphic representations of physical world functionalities. When a user moves their controller over the desired tool, and presses a button, the functionality of their previous controller may be replaced with a visual representation of the new tool, and that controller may be given the functionality expected of that tool.

A Measuring Tool 635 may replicate the functionality of a rangefinder and inclinometer in the virtual world, and allow the selection of objects to report their bounding box dimensions (the measurement of the object's volume in height, width, and depth).

An Interaction Tool 620 may enable a variety of object-specific functionality through invoking a "context menu" around a selected object in the virtual world. If that object has specific functions that are unique to it, they may appear in the menu for that object and can be selected. Common ones may include "Delete" which removes an object from the scene, or "Animate" which sets a keyframe for that moment in time, and allows the user to change time, and move the object to a new location at a different point in time creating a spatial interpolation for that object across that range of time. Some more object-dependent examples may include: when selecting a camera, a "Change Lens" option may be made available; when selecting an animatable character, a "Puppet" option may be made available; when selecting an animation spline, an "Add point" option may be made available. Publishable parameters for an object in the scene may automatically represent themselves in the context menu for that object available by using the Interaction Tool.

A Navigation Tool 610 may allow the user to move about the virtual world through a variety of means. Pointing the controller in a direction and pressing a button may pull the user in that direction as though they're flying a plane. Touching another button may cause an arc to appear in front of the user which proceeds until it collides with an object in the scene which is designated to receive such collisions. Pressing that same button down fully may cause the user to instantly jump to that location. Pressing another button may cause the controller to "grab" that location in space so that if the user moves their hand, they will translate their physical location in the virtual world as though they were able to "grab air" and pull themselves around with it. Within this home menu system, there may also exist user-definable sliders or input "switches" to adjust the sensitivity of these controls. For example, one slider might control "flight speed" when using the "flight" method of navigation. A checkbox might enable inertia for the "grab navigation" method so the user continues to drift in a vector when they've released the Grab Button.

A Snapshot tool 630 may allow the user to take pictures in the virtual world. The snapshots can be saved out of the system and shared with other users in either the virtual world, or the physical one. The snapshots may contain metadata like location, field of view, user name, date and other user-definable parameters. Additionally, the snapshot tool may control external systems which are connected to the virtual production system. For example, the virtual world may operate with the limitation of needing to maintain a minimum refresh rate in order to ensure healthy operations for human users, but sometimes a desired aesthetic has requirements that would drop performance of the system below acceptable thresholds. In this event, another computer may be used on the same system, or an external system may be connected which would receive information about where that snapshot was taken, confirm that is has parity between the scene state in the virtual world, and an alternate virtual world that exists at a higher quality, but lower refresh rate, and then it will render that imagery to an image file that would be passed back to the Virtual Production System, where it may update the snapshot taken with a higher quality representation. This may allow users to operate in a more comfortable real-time virtual world which may be lower quality, while still making informed creative decisions by seeing alternate representations of their work in context.

A Marker Tool 640 may allow the user in the virtual world to leave annotations, drawings, arrows, notes, or other visual indications that serve as a means to communicate a path, or other information to other users in the system, or to be exported to subsequent users of the data from this system in other systems.

Figure 12A:
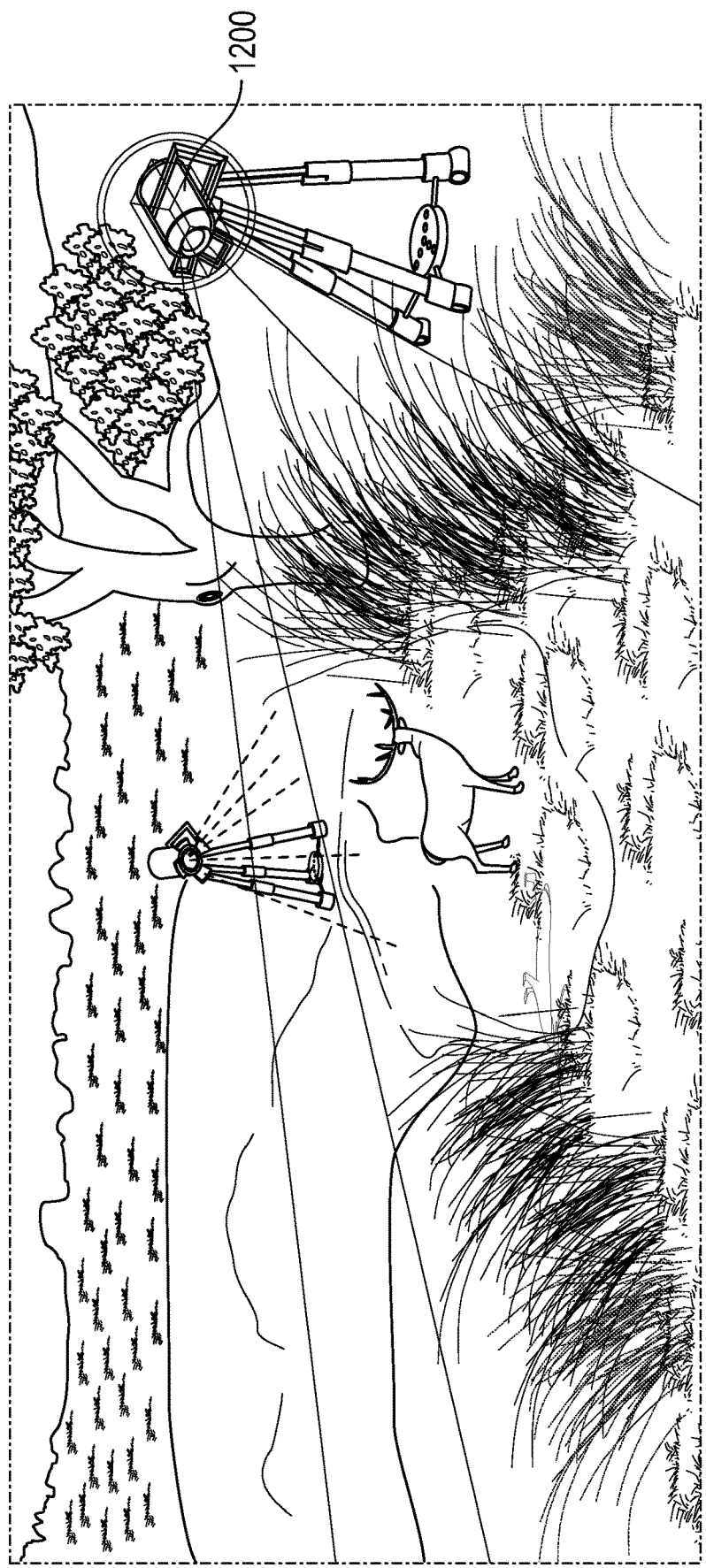
FIG. 12A illustrates example implementations of gaffer tools that may be instantiated and rendered in the virtual world of FIG. 6.
Figure 12B:
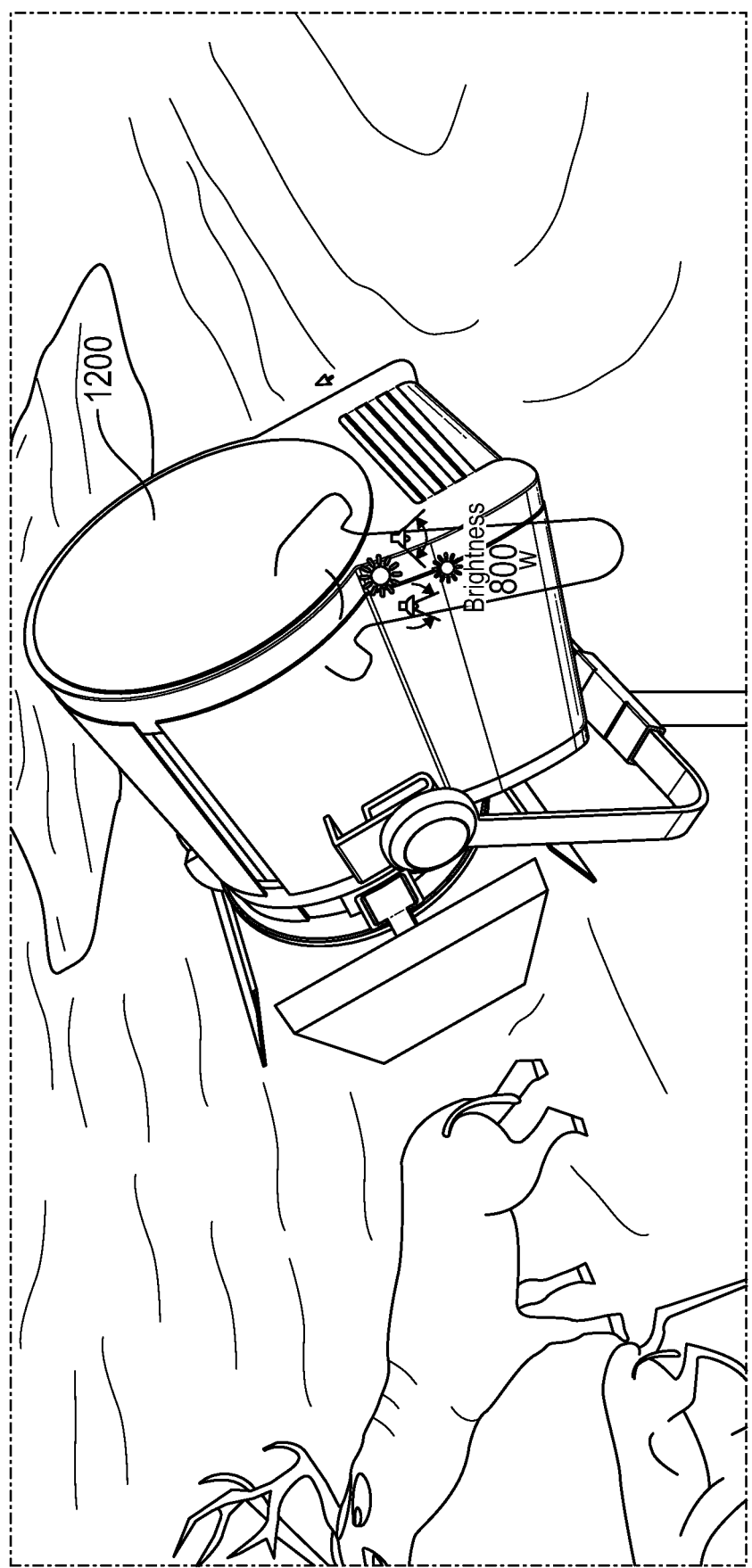
FIG. 12B illustrates example implementations of gaffer tools that may be instantiated and rendered in the virtual world of FIG. 6.

A Gaffer Tool 645 may allow the user to create a variety of light sources that are represented by virtual avatars for their physical world counterparts. Pressing a button may create a light source in the scene, and putting the user's controller in contact with the virtual object, or selecting it remotely may allow the user to change a variety of parameters in the light source ranging from beam intensity, hue, color temperature, beam focus, and falloff. These values can be recorded and streamed so they can be passed into subsequent systems, or can be connected to physical lights in the physical world so that changes in either the physical or virtual world, can communicate and correspond with the relevant light in the opposing world. FIGS. 12A-12B illustrate example implementations of gaffer tools 1200 that may be instantiated and rendered in a virtual world 600.

A Laser Pointer Tool 650 may allow the user to indicate to other users or observers in the system where they'd like to direct their attention, with functional parity to its physical world counterpart.

A Tripod Tool 655 may allow the user to create a virtual camera support platform which will visually and functionally match it's physical world counterpart. When the tripod tool is invoked by a user, they may connect their controller (e.g., VR HMD handheld controller) to a calibrated mount on the physical world tripod, which will ensure a registration between the physical world and the virtual world. This registration may also be also be accomplished by optical tracking in the physical world, or through the use of encoders. Movements of the physical world tripod may drive matching movements in the virtual world, and objects such as cameras, which may be parented to it.

A Crane Tool 660 may allow the user to create a virtual camera support platform which will visually and functionally match it's physical world counterpart. When the crane tool is invoked by a user, they may connect their controller (e.g., VR HMD handheld controller) to a calibrated mount on the physical world crane, which will ensure a registration between the physical world and the virtual world, enabling tactile operation. This registration may also be also be accomplished by optical tracking in the physical world, or through the use of encoders. Movements of the physical world crane may drive matching movements in the virtual world, and objects such as cameras, which may be parented to it.

A Dolly Tool 665 may allow the user to create a series of key points or vertices in space by pressing buttons while their controller exists at those points, representing a path they'd like to create for movement in the virtual world. When they have made at least two vertices, they can commit the path, by pressing another button, which creates a three dimensional spline path in the virtual world. At each vertex of the spline, there may exist two tangents representing the incoming and outgoing force of the path being interpolated between those vertices. The user may move these vertices and tangents by intersecting them in with their controller in the virtual world. The user may also invoke a context menu which allows them to make changes to the path scale, rotation, or translation, add or delete vertices, apply smoothing functions, or other modifications to the user determined spline in the virtual world. The spline may contain a virtual attachment point which can slide along the spline in either direction, and can inherit certain rotational orientations relative to the spline coordinates, or take them from the world coordinate system. This attachment point can be connected to any other virtual object in the system, (e.g., a camera, a dolly, a user, etc.). In the physical world, this attachment point can be registered to connect to a physical dolly which rides along a dolly track and can be operated by motor, or manually through human force. The movement in the physical world dolly can be registered to the virtual world spline attachment point by optical tracking, inertial sensors, or electromechanical encoders.

In implementations, the path of the physical dolly need not match the virtual path because the system may translate the movement along the physical path as progress between two calibrated points that may be represented in the system as 0 and 1. This allows any other device or value in the system to initiate change in the virtual spline path by feeding it values between 0 and 1. For example, an audio crossfader could map Left and Right to 0 and 1 so the virtual spline path attachment point would move when it receives a broadcast signal from the audio crossfader. Because the spline path may be a time varying object in the virtual production system, it may have a representation in the timeline, and if the user desires, they may tell the spline attachment point to determine its location from the present moment in time along the timeline representation of the spline path. Dragging the spline path representation in the timeline to be longer, would make the attachment point move slower, for example.

In addition to the aforementioned tools, the virtual menu system 605 in the virtual world may offer several other sections of functionality to users in the virtual world. A preferences section may provide access to user-definable sliders which disable/enable certain functionalities, or adjust the sensitivity of the functionality through sliders or knobs. The 3D menu system may also offer a collaboration section which allows users to see other users in the system in order to distinguish their avatars, allows them to see markers that other users have made in the scene, and allows them to see active cameras in the scene. Putting a controller over any of these objects in the collaboration section of the menu may show a user a visible line to these objects in the virtual world, so that the user can fly to them. Pressing a button while hovering over any of these objects (users, markers, cameras, etc.) can instantly teleport the user to their location in the virtual world. The virtual menu system may also access to undo and redo buttons which can traverse the history state for that user's actions.

For applications of the system which require the combination of live-action material from the physical world and computer generated imagery from the virtual world in real-time, a video signal may be taken from a cinema camera and combined with metadata either from hardware systems in the camera system, or manually-entered values, that represent relevant parameters of the camera such as resolution, aspect ratio, film-back measurements, lens focal length, and field of view. The translation and rotation values of the camera may be derived by employing a tracking system which may involve the use of inertial sensors, optical tracking systems, electromechanical encoders, or optical image analysis. These resulting values, plus any desired registration offsets, may be fed into the Virtual Production System.

If the subject requires layering the live-action material from the physical world in depth between objects in the virtual world, a system of real-time chroma-keying can be introduced that will process the video signal to remove undesired portions of the video frame represented by selectable ranges of color saturation. The registration system in tracking the physical world can ensure that the virtual world and the physical world move in synchronization as the viewpoint is changed in the physical world. If it is the user's preference to prioritize making the viewpoint changes in the virtual world, a motion control camera can be employed in the physical world which will relocate the physical camera to match the virtual camera's position in the virtual world. If the user's observation exists in the virtual world, a virtual reality headset may be employed to see the combined image. If the user's observation exists in the physical world, either a traditional video monitor may be used if the user accepts their viewpoint to be constrained to the observing camera, or an AR (sometimes called MR) headset can be used that overlays the virtual world on top of the user's view of the physical world, which would allow them to move freely in space, seeing the virtual and physical worlds simultaneously in context.

Figure 13:
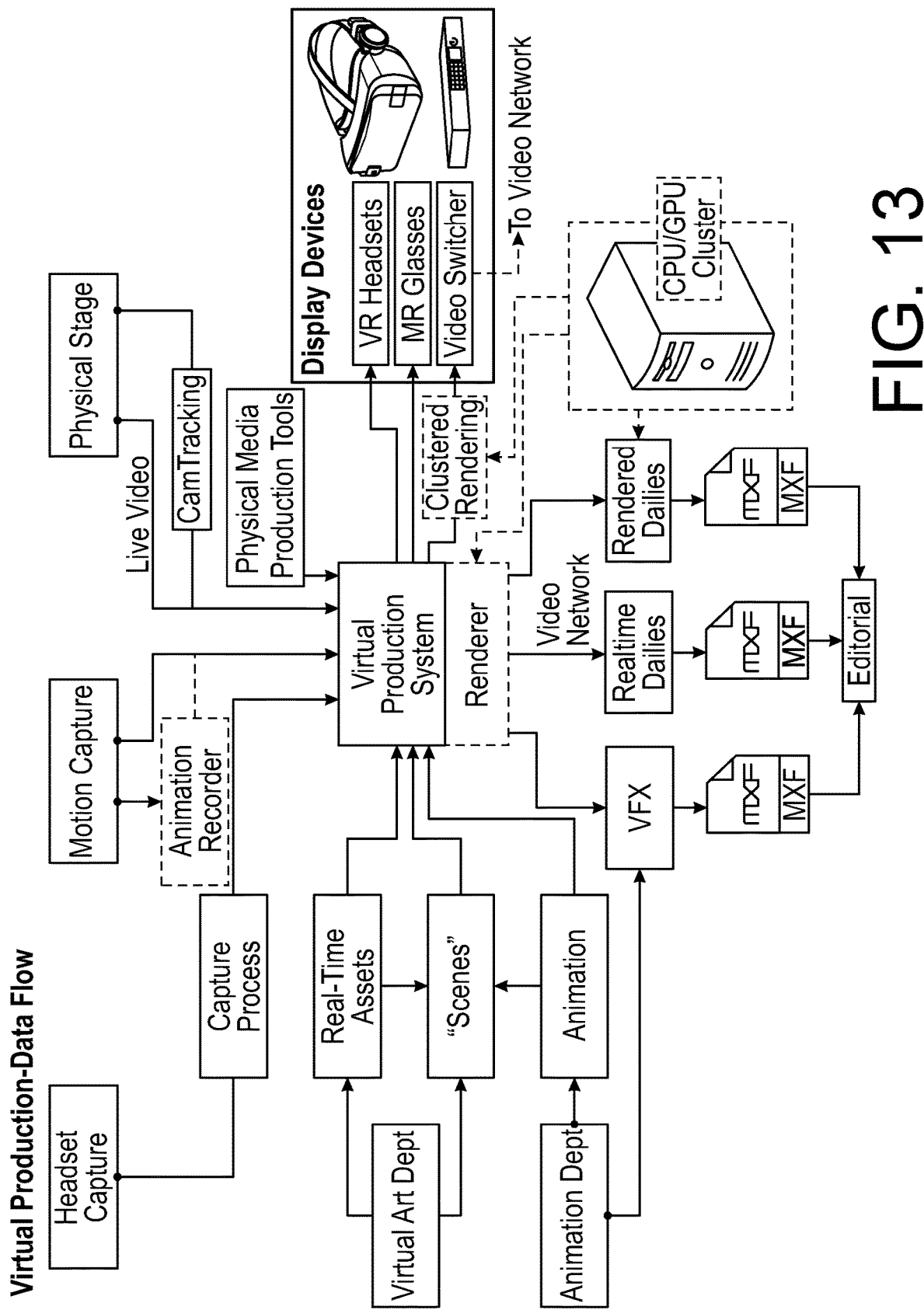
FIG. 13 illustrates a virtual production data flow process including a flow of data information, which may be implemented in a gaming environment in accordance with a particular embodiment.

FIG. 13 illustrates an example virtual production data flow process including a flow of data information, that may be implemented in a gaming environment in accordance with a particular embodiment. On the data flow side, three elements may come together. First, a headset may capture volumetric video of actors in the real world. Second, a motion capture stage may use an array of cameras that observe the actions of actors and output tracking data obtained from the moving actors (e.g., motion capture data corresponding to characters). Third, a physical stage may correspond to a live action location shoot or green screen shot. The physical stage can feed a live signal from a video camera and cam tracking into the virtual production system, which may include a game engine.

Data from these different types of inputs can come into the virtual production system where they undergo processes to prepare and reconcile them in the game engine environment, which may be a combination of commercial rendering technology combined with the custom developments and backend software that supports it. The game engine of the virtual production system may create a virtual world that can have physical world components, and from within that world, a user may experience all of the data inputs in context so that they are layered together.

Additionally, a virtual art department may design and build real-time assets and collect them into sets or "scenes." The assets may be loaded into the game engine. An animation department may animate virtual characters created by the virtual art department, load those animations into scenes, and provide updates through a variety of open industry standard formats. These updates may go to the game engine that causes characters of the game engine to come pre-animated a certain way. Where character animation is used, assets associated with the character model may be loaded into the game and an actor could perform the model live. As such, live action footage, an animation recording, hybrid data, and completely computer generated imagery may be inserted into the game engine world.

Once content has been created in the game engine, camera footage from any point of view in the game engine may be streamed out and displayed using a variety of video display devices. For example, VR/AR HMDs, touchscreen displays, conventional desktops, laptops, television displays, and other devices may be used to display the output from the game engine. In some instances, a video switcher may feed the signal to a video network, and a computer cluster may provide additional computational resources to provide high fidelity and real-time rendering of footage coming out of the game engine.

As also illustrated by FIG. 13, the outputs from the game engine may include "realtime dailies" that provide real time output of content from the game engine at a minimum frame rate to represent what visuals were seen at that moment in time, and "rendered dailies" that provide a high fidelity, but not necessarily real time output of the previous events from the game engine. For example, rendered dailies may be triggered after the "Stop" command has been issued, and reduce the speed of rendering from 24 frames per second to one frame per second, or lower in order to achieve maximum visual resolution and quality at the expense of speed.

Additionally, data recordings from inside the game engine may be saved and recorded out for use by another system. For example, all recorded actions and keyframe animations for any objects that are changed, including metadata specifying the object's state before recordation, may be saved out and reconstructed in another system such as a post-production editorial for further additions and changes.

Figure 14:
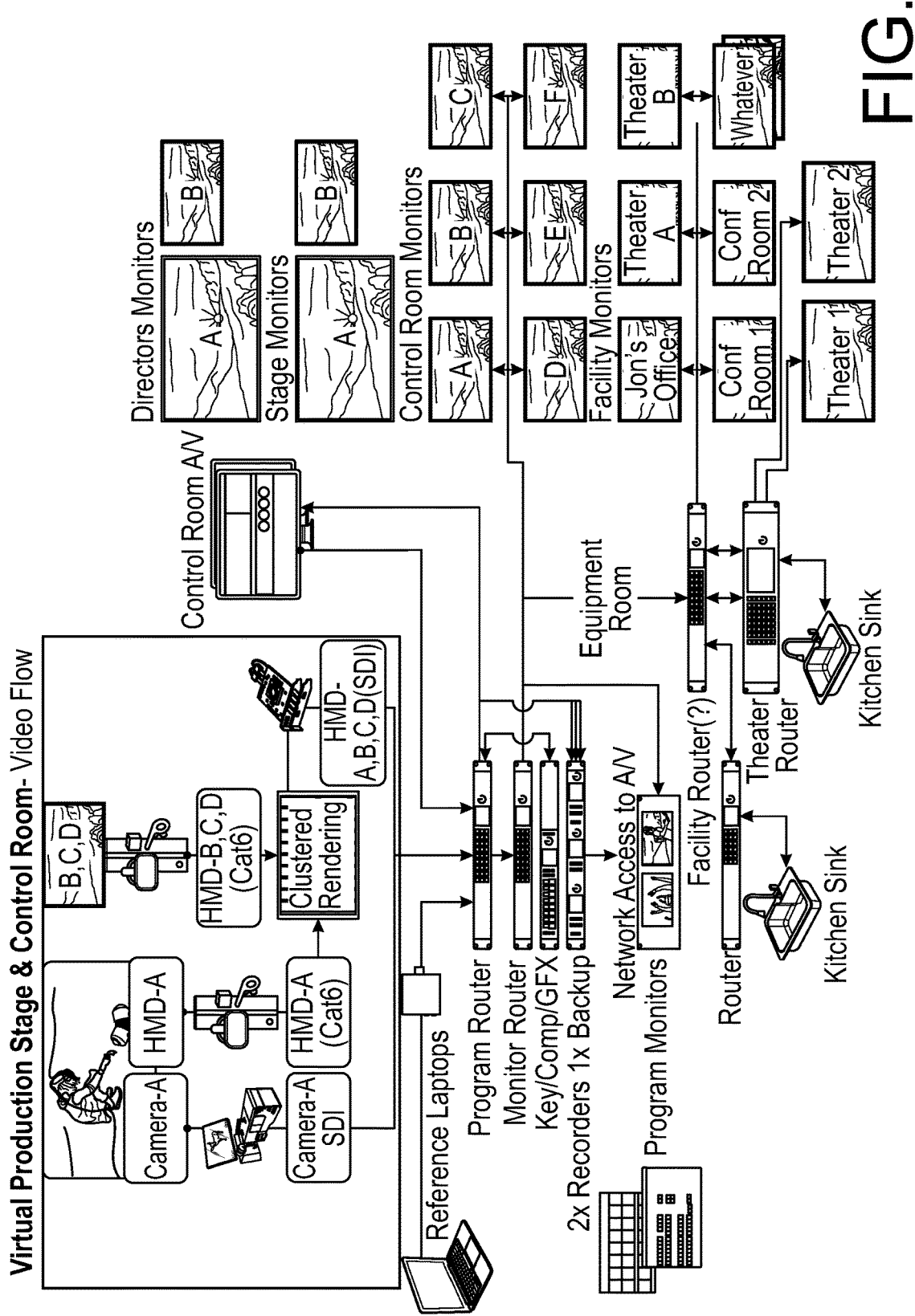
FIG. 14 illustrates a virtual production stage and control room video flow process, including a flow of video information, which may be implemented in accordance with a particular embodiment.

FIG. 14 illustrates an example virtual production stage and control room video flow process, including a flow of video information, that may be implemented in accordance with a particular embodiment. As illustrated, computer graphics may be combined with the live action world in real-time. Camera A may capture a person on a green screen and feed the signal into a video router. The HMD of the person may display a virtual world including a computer-generated object and may capture user inputs through hand-held HMD controls. Additionally, other users participating in the system (e.g., HMD users B, C, and D) may stream out their feed. The feeds of the various HMD users (e.g., A, B, C, and D) may pass through a computer cluster that provides additional computational resources for real-time rendering and processing. These feeds may be converted to standard video cable signals (e.g., HDMI) that feeds out to one or more routers that may act as video switchers. The routers may route feeds to record decks, route feeds to green screens, or route feeds to a video and audio production system (e.g., so users in a control room can see what someone on stage is seeing).

While primarily described in the context of computer-generated film creation, it should be noted that embodiments described herein may be applicable in many forms of content creation. They can be used to create feature films, both 2D and 3D; television programs; commercials, and web content. They can also be used to convert rich volumetric visualizations into traditional media. For example, a scientific visualization of cellular biology could be explored by users who can stream out video broadcasts or traditional videos. Embodiments disclosed herein may be applicable in situations that involve augmenting the physical world with computer generated imagery, or ones that are entirely comprised of computer generated imagery. Additionally, it can be used to create virtual reality and augmented or mixed reality content that users can experience from within the scene.

Figure 15:
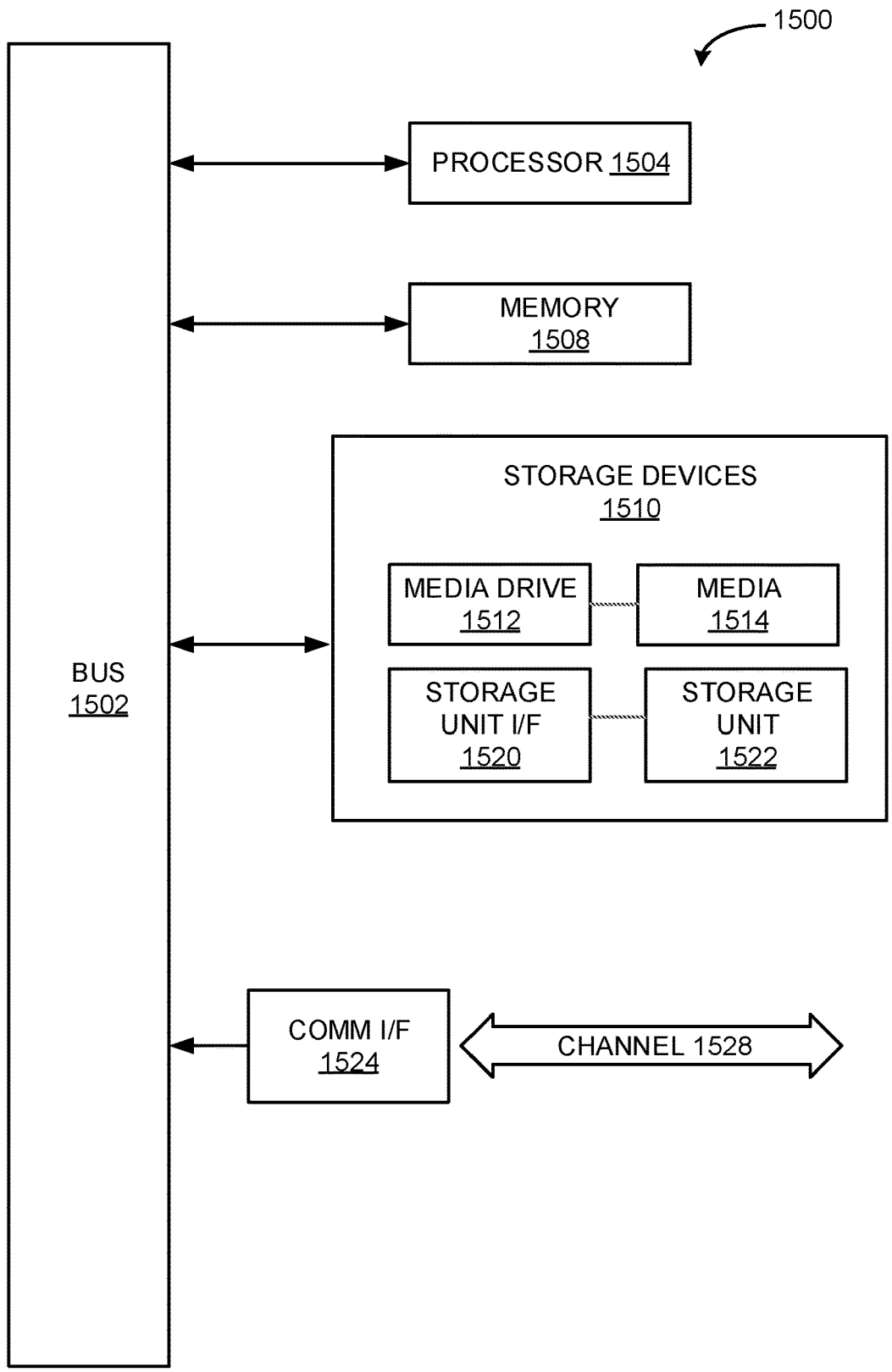
FIG. 15 illustrates an example computing module that may be used to implement various features of the methods disclosed herein.

FIG. 15 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example-computing module 1500. After reading this description, it will become apparent to a person skilled in the relevant art how to implement the application using other computing modules or architectures.

Referring now to FIG. 15, computing module 1500 may represent, for example, computing or processing capabilities found within desktop, laptop, notebook, and tablet computers; hand-held computing devices (tablets, PDA's, smart phones, cell phones, palmtops, etc.); wearable devices (e.g., HMD); mainframes, supercomputers, workstations or servers; or any other type of special-purpose or general-purpose computing devices as may be desirable or appropriate for a given application or environment. Computing module 1500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1500 might include, for example, one or more processors, controllers, control modules, or other processing devices, such as a processor 1504. Processor 1504 might be implemented using a general-purpose or special-purpose processing engine such as, for example, a microprocessor, controller, or other control logic. In the illustrated example, processor 1504 is connected to a bus 1502, although any communication medium can be used to facilitate interaction with other components of computing module 1500 or to communicate externally.

Computing module 1500 might also include one or more memory modules, simply referred to herein as main memory 1508. For example, preferably random access memory (RAM) or other dynamic memory, might be used for storing information and instructions to be executed by processor 1504. Main memory 1508 might also be used for storing temporary variables or other intermediate information during execution of instructions to be executed by processor 1504. Computing module 1500 might likewise include a read only memory ("ROM") or other static storage device coupled to bus 1502 for storing static information and instructions for processor 1504.

The computing module 1500 might also include one or more various forms of information storage mechanism 1510, which might include, for example, a media drive 1512 and a storage unit interface 1520. The media drive 1512 might include a drive or other mechanism to support fixed or removable storage media 1514. For example, a hard disk drive, a solid state drive, a magnetic tape drive, an optical disk drive, a CD or DVD drive (R or RW), or other removable or fixed media drive might be provided. Accordingly, storage media 1514 might include, for example, a hard disk, a solid state drive, magnetic tape, cartridge, optical disk, a CD, DVD, or Blu-ray, or other fixed or removable medium that is read by, written to or accessed by media drive 1512. As these examples illustrate, the storage media 1514 can include a computer usable storage medium having stored therein computer software or data.

In alternative embodiments, information storage mechanism 1510 might include other similar instrumentalities for allowing computer programs or other instructions or data to be loaded into computing module 1500. Such instrumentalities might include, for example, a fixed or removable storage unit 1522 and an interface 1520. Examples of such storage units 1522 and interfaces 1520 can include a program cartridge and cartridge interface, a removable memory (for example, a flash memory or other removable memory module) and memory slot, a PCMCIA slot and card, and other fixed or removable storage units 1522 and interfaces 1520 that allow software and data to be transferred from the storage unit 1522 to computing module 1500.

Computing module 1500 might also include a communications interface 1524. Communications interface 1524 might be used to allow software and data to be transferred between computing module 1500 and external devices. Examples of communications interface 1524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1524 might typically be carried on signals, which can be electronic, electromagnetic (which includes optical) or other signals capable of being exchanged by a given communications interface 1524. These signals might be provided to communications interface 1524 via a channel 1528. This channel 1528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1508, storage unit 1522, and media 1514. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
    initializing a virtual production application instance on a virtual reality (VR) client device;
    loading scene files and dependencies at the virtual production application;
    based on the loaded scene files and dependencies, rendering a virtual world for display by the VR client device; and
    the VR client device making changes to the scene files using a virtual media production tool rendered in the virtual world, wherein the virtual media production tool corresponds to a physical media production tool communicatively coupled to the VR client device.

2. The method of claim 1, wherein the VR client device comprises a VR head-mounted display (HMD), wherein the virtual world is displayed on the VR HMD, and wherein the VR client device makes changes to the scene files using a controller communicatively coupled to the VR HMD.

3. The method of claim 2, further comprising:
    receiving data corresponding to user input actuating a control coupled to the physical media production tool; and
    registering the data with the virtual media production tool rendered in the virtual world.

4. The method of claim 3, wherein the controller is a handheld controller, and wherein receiving data corresponding to user input actuating the control coupled to the physical media production tool and registering the data with the virtual world comprises:
    mounting the handheld controller on a mount coupled to the physical media production tool;
    tracking movement of the physical media production tool using a motion sensor of the mounted handheld controller; and
    registering the tracked movement with an object in the virtual world.

5. The method of claim 2, further comprising:
    displaying a user interface in the rendered virtual world for selecting a plurality of virtual media production tools;
    receiving data corresponding to user input at the controller of the VR HMD selecting the virtual media production tool; and
    instantiating and rendering the virtual media production tool.

6. The method of claim 5, further comprising:
    receiving data corresponding to user input actuating a virtual control for changing a state of the virtual media production tool; and
    making a corresponding change to the physical media production tool.

7. The method of claim 1, further comprising:
    receiving data corresponding to user input actuating a control coupled to the physical media production tool; and
    registering the data with the virtual media production tool rendered in the virtual world.

8. The method of claim 7, wherein receiving data corresponding to user input actuating the control coupled to the physical media production tool and registering the data with the virtual world comprises:
    tracking movement of the physical media production tool using a motion sensor mounted on the physical media production tool;
    encoding the tracked movement; and
    transmitting the encoded tracked movement to the VR device for registration with the virtual media production tool of the virtual world.

9. The method of claim 7, wherein the physical media production tool comprises: a video camera, a camera dolly, a camera crane, or a tripod, and wherein the virtual media production tool comprises: a corresponding virtual video camera, virtual camera dolly, virtual camera crane, or virtual tripod.

10. The method of claim 9, wherein the physical media production tool comprises the camera dolly, wherein receiving data corresponding to user input actuating the control coupled to the physical media production tool comprises moving the camera dolly along a dolly track, and wherein registering the data with the virtual world comprises registering the movement of the camera dolly to a virtual world spline attachment point.

11. The method of claim 7, wherein registering the data with the virtual world comprises:
    passing the data corresponding to user input actuating the control coupled to the physical media production tool as an input to a node graph; and
    evaluating the node graph using the input.

12. The method of claim 1, further comprising:
    transmitting, via the client device, the changes to the scene files to a server; and
    broadcasting, via the server, the changes to the scene files to a plurality of other VR client devices to synchronize a virtual world rendered by the plurality of other VR client devices with the virtual world rendered by the client device.

13. A system, comprising:
    a virtual reality (VR) client device;
    one or more non-transitory computer-readable mediums having instructions stored thereon that, when executed by one or more processors, causes the system to:
        initialize a virtual production application instance;
        load scene files and dependencies at the virtual production application;
        based on the loaded scene files and dependencies, render a virtual world for display by the VR client device; and
        the VR client device making changes to the scene files using a virtual media production tool rendered in the virtual world, wherein the virtual media production tool corresponds to a physical media production tool communicatively coupled to the VR client device.

14. The system of claim 13, wherein the VR client device comprises a VR head-mounted display (HMD), wherein the virtual world is displayed on the VR HMD, the system further comprising: the physical media production tool communicatively coupled to the VR client device, wherein the instructions when executed by the one or more processors, further causes the system to:
  receive data corresponding to user input actuating a control coupled to the physical media production tool; and
  register the data with the virtual media production tool rendered in the virtual world.

15. The system of claim 14, wherein the VR HMD is communicatively coupled to a handheld controller, and wherein receiving data corresponding to user input actuating the control coupled to the physical media production tool and registering the data with the virtual media production tool rendered in the virtual world comprises:
  mounting the handheld controller on a mount of the physical media production tool;
  tracking movement of the physical media production tool using a motion sensor of the mounted handheld controller; and
  registering the tracked movement with an object in the virtual world.

16. The system of claim 14, wherein the physical media production tool comprises: a video camera, a camera dolly, a camera crane, or a tripod, and wherein the virtual media production tool comprises: a corresponding virtual video camera, virtual camera dolly, virtual camera crane, or virtual tripod.

17. The system of claim 16, wherein the physical media production tool comprises the camera dolly, wherein receiving data corresponding to user input actuating the control coupled to the physical media production tool comprises moving the camera dolly along a dolly track, and wherein registering the data with the virtual world comprises registering the movement of the camera dolly to a virtual world spline attachment point.

18. The system of claim 14, wherein registering the data with the virtual media production tool rendered in the virtual world comprises:
  passing the data corresponding to user input actuating the control coupled to the physical media production tool as an input to a node graph; and
  evaluating the node graph using the input.

19. The system of claim 13, wherein the instructions when executed by the one or more processors, further causes the system to:
  display a user interface in the rendered virtual world for selecting a plurality of virtual media production tools;
  receive data corresponding to user input at a controller of the VR client device selecting the virtual media production tool; and
  instantiate and render the virtual media production tool.

20. The system of claim 19, wherein the instructions when executed by the one or more processors, further causes the system to:
  receive data corresponding to user input actuating a virtual control for changing a state of the virtual media production tool; and
  make a corresponding change to the physical media production tool communicatively coupled to the VR client device.

21. A method, comprising:
  consolidating scene files and dependencies at a master media production device;
  transmitting the consolidated scene files and dependencies from the master media production device to each of a plurality of virtual reality (VR) client devices;
  transmitting the consolidated scene files and dependencies from the master media production device to a server;
  loading, at each of the plurality of VR client devices, the consolidated scene files and dependencies to render a virtual world, wherein a view of the rendered virtual world is displayed by each of the plurality of VR client devices; and
  synchronizing, via the server, across the plurality of VR client devices, any changes made to the consolidated scene files and dependencies by one of the plurality of VR client devices.

22. The method of claim 21, wherein the changes made to the consolidated scene files and dependencies are synchronized in real-time by the server, wherein the view of the rendered virtual world is displayed by a head-mounted display (HMD) of each of the plurality of VR client devices.

23. The method of claim 22, further comprising: transmitting an instruction from the master media production device to each of the plurality of VR client devices to begin recording changes to the consolidated scene files and dependencies.

* * * * *